(12) United States Patent
Nihei

(10) Patent No.: US 8,760,738 B2
(45) Date of Patent: Jun. 24, 2014

(54) METHOD OF MEASURING A DEVIATION IN TIMING OF A START OF WRITING IN SCANNING LINES, OPTICAL SCANNING DEVICE, AND IMAGE FORMING APPARATUS

(75) Inventor: Yasuhiro Nihei, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 551 days.

(21) Appl. No.: 12/978,833

(22) Filed: Dec. 27, 2010

(65) Prior Publication Data

US 2011/0170152 A1    Jul. 14, 2011

(30) Foreign Application Priority Data

Jan. 12, 2010 (JP) ................................. 2010-003679

(51) Int. Cl.
*H04N 1/46* (2006.01)
(52) U.S. Cl.
USPC ........................................................ 358/509
(58) Field of Classification Search
CPC ..... G06K 15/1219; B41J 2/473; H04N 1/053; H04N 1/0473
See application file for complete search history.

(56) References Cited

U.S. PATENT DOCUMENTS

| | | | |
|---|---|---|---|
| 6,236,415 B1 * | 5/2001 | Nozaki et al. | 347/116 |
| 6,275,281 B1 * | 8/2001 | Nozaki | 355/35 |
| 6,469,730 B2 * | 10/2002 | Tanimoto et al. | 347/249 |
| 6,642,949 B2 * | 11/2003 | Nozaki et al. | 347/235 |
| 6,791,596 B2 | 9/2004 | Nihei et al. | |
| 6,927,789 B2 | 8/2005 | Ozasa et al. | |
| 6,933,957 B2 | 8/2005 | Omori et al. | |
| 7,212,224 B2 | 5/2007 | Nihei et a | |
| 7,256,815 B2 | 8/2007 | Suzuki et al. | |
| 7,271,824 B2 | 9/2007 | Omori et al. | |
| 7,283,151 B2 | 10/2007 | Nihei et al. | |
| 7,327,379 B2 | 2/2008 | Nihei et al. | |
| 7,456,856 B2 | 11/2008 | Nihei | |
| 7,515,170 B2 | 4/2009 | Omori et al. | |

(Continued)

FOREIGN PATENT DOCUMENTS

| | | |
|---|---|---|
| JP | 2003-39733 | 2/2003 |
| JP | 2003-276234 | 9/2003 |

(Continued)

OTHER PUBLICATIONS

Japanese Office Action mailed on Dec. 5, 2013 in counterpart Japanese Application No. 2010-003679, 2 pages.

*Primary Examiner* — Jeremiah Bryar
(74) *Attorney, Agent, or Firm* — Oblon, Spivak, McClelland, Maier & Neustadt, L.L.P.

(57) ABSTRACT

A method for measuring a deviation in timing of start of writing in scanning lines is implemented by an optical scanning device that scans a surface to be scanned with light beams from light-emitting elements having first and second light-emitting elements which are arranged so as to be displaced from each other in a direction corresponding to a direction of the scanning lines. The method includes: detecting timing at which light from the first light-emitting element is received by a light receiving element, as a first time, the light receiving element outputting a synchronization detecting signal before start of writing; detecting timing at which light from the second light-emitting element is received by the light receiving element, as a second time; and obtaining the deviation in timing for the second light-emitting element with respect to the first light-emitting element based on a difference between the first and second time.

16 Claims, 33 Drawing Sheets

(56) References Cited

U.S. PATENT DOCUMENTS

| | | |
|---|---|---|
| 7,701,480 B2 | 4/2010 | Omori et al. |
| 7,760,223 B2 | 7/2010 | Suzuki et al. |
| 2005/0089069 A1 | 4/2005 | Ozasa et al. |
| 2005/0219354 A1 | 10/2005 | Omori et al. |
| 2006/0285186 A1 | 12/2006 | Ishida et al. |
| 2007/0030548 A1 | 2/2007 | Nihei et al. |
| 2007/0132828 A1 | 6/2007 | Ishida et al. |
| 2007/0242127 A1 | 10/2007 | Omori et al. |
| 2007/0285495 A1 | 12/2007 | Nihei et al. |
| 2008/0012933 A1 | 1/2008 | Nihei et al. |
| 2008/0042700 A1 | 2/2008 | Nihei et al. |
| 2008/0088893 A1 | 4/2008 | Ishida et al. |
| 2008/0123160 A1 | 5/2008 | Omori et al. |
| 2008/0218813 A1 | 9/2008 | Tanabe et al. |
| 2008/0239336 A1 | 10/2008 | Tanabe et al. |
| 2008/0291259 A1 | 11/2008 | Nihei et al. |
| 2009/0091805 A1 | 4/2009 | Tanabe et al. |
| 2009/0167837 A1 | 7/2009 | Ishida et al. |
| 2009/0174915 A1 | 7/2009 | Nihei et al. |
| 2009/0195635 A1 | 8/2009 | Ishida et al. |
| 2010/0045767 A1 | 2/2010 | Nihei et al. |
| 2010/0119262 A1 | 5/2010 | Omori et al. |
| 2010/0214637 A1 | 8/2010 | Nihei et al. |

FOREIGN PATENT DOCUMENTS

| | | |
|---|---|---|
| JP | 2006-150822 | 6/2006 |
| JP | 2008-26542 | 2/2008 |
| JP | 2008-310281 | 12/2008 |
| JP | 2009-160812 | 7/2009 |

* cited by examiner

FIG. 19

| IMAGE DATA | MODULATION DATA<br>BIT 15 ········ BIT 0 |
|---|---|
| 0000 | 0000000000000000 |
| 0001 | 0000000000000001 |
| 0010 | 0000000000000011 |
| 0011 | 0000000000000111 |
| 0100 | 0000000000001111 |
| 0101 | 0000000000011111 |
| 0110 | 0000000000111111 |
| 0111 | 0000000001111111 |
| 1000 | 0000000011111111 |
| 1001 | 0000000111111111 |
| 1010 | 0000001111111111 |
| 1011 | 0000011111111111 |
| 1100 | 0000111111111111 |
| 1101 | 0001111111111111 |
| 1110 | 0011111111111111 |
| 1111 | 0111111111111111 |

FIG. 20

| CORRECTION DATA BIT 3 TO 0 | MODULATION DATA [15: 0] |
|---|---|
| 0000 | {MODULATION DATA A [15: 0]} |
| 0001 | {MODULATION DATA A [14: 0], {MODULATION DATA B [15]}} |
| 0010 | {MODULATION DATA A [13: 0], {MODULATION DATA B [15: 14]}} |
| 0011 | {MODULATION DATA A [12: 0], {MODULATION DATA B [15: 13]}} |
| 0100 | {MODULATION DATA A [11: 0], {MODULATION DATA B [15: 12]}} |
| 0101 | {MODULATION DATA A [10: 0], {MODULATION DATA B [15: 11]}} |
| 0110 | {MODULATION DATA A [9: 0], {MODULATION DATA B [15: 10]}} |
| 0111 | {MODULATION DATA A [8: 0], {MODULATION DATA B [15: 9]}} |
| 1000 | {MODULATION DATA A [7: 0], {MODULATION DATA B [15: 8]}} |
| 1001 | {MODULATION DATA A [6: 0], {MODULATION DATA B [15: 7]}} |
| 1010 | {MODULATION DATA A [5: 0], {MODULATION DATA B [15: 6]}} |
| 1011 | {MODULATION DATA A [4: 0], {MODULATION DATA B [15: 5]}} |
| 1100 | {MODULATION DATA A [3: 0], {MODULATION DATA B [15: 4]}} |
| 1101 | {MODULATION DATA A [2: 0], {MODULATION DATA B [15: 3]}} |
| 1110 | {MODULATION DATA A [1: 0], {MODULATION DATA B [15: 2]}} |
| 1111 | {MODULATION DATA A [0], {MODULATION DATA B [15: 1]}} |

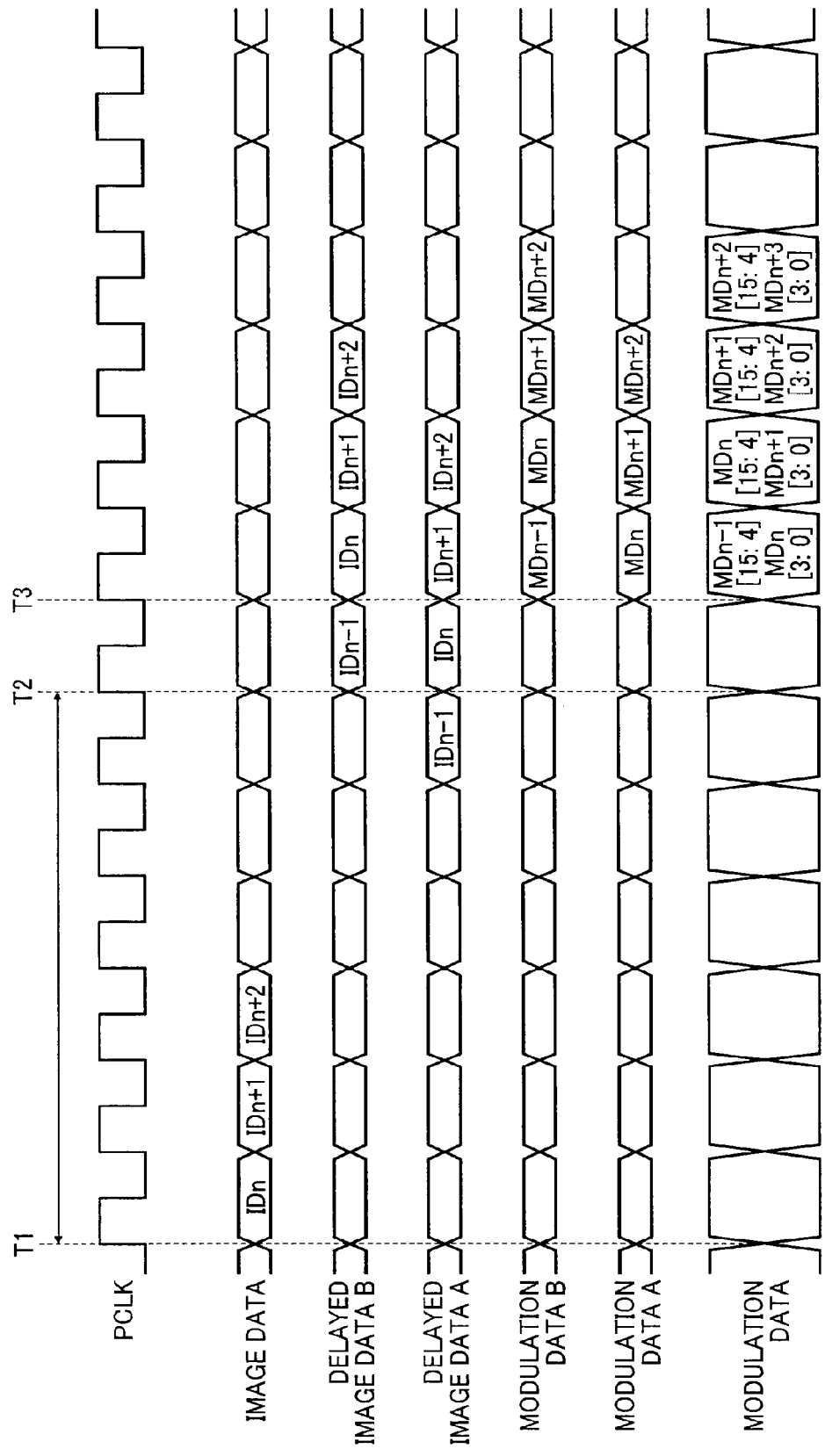

| LIGHT-EMITTING ELEMENT COLUMN | DISTANCE FROM FIRST-COLUMN LIGHT-EMITTING ELEMENTS IN M DIRECTION (μm) | POSITIONS OF LIGHT SPOTS WITH RESPECT TO FIRST-COLUMN SPOTS IN MAIN SCANNING DIRECTION ON SURFACE TO BE SCANNED (μm) | | | POSITIONS OF LIGHT SPOTS WITH RESPECT TO FIRST-COLUMN SPOTS IN MAIN SCANNING DIRECTION ON SURFACE TO BE SCANNED (NUMBER OF PIXELS) * | | |
|---|---|---|---|---|---|---|---|
| | | MAGNIFICATION RATIO = 4 | MAGNIFICATION RATIO = 5 | MAGNIFICATION RATIO = 6 | MAGNIFICATION RATIO = 4 | MAGNIFICATION RATIO = 5 | MAGNIFICATION RATIO = 6 |
| SECOND COLUMN | 30 | 120 | 150 | 180 | 5.7 | 7.1 | 8.6 |
| THIRD COLUMN | 60 | 240 | 300 | 360 | 11.4 | 14.3 | 17.1 |
| FOURTH COLUMN | 90 | 360 | 450 | 540 | 17.1 | 21.4 | 25.7 |

* NUMBER OF PIXELS IN 1200 dpi (21 μm/dot)

| LIGHT-EMITTING ELEMENT COLUMN | THE NUMBER OF STAGES IN SHIFT REGISTER | FLIP FLOPS CONNECTED TO SELECTOR CIRCUIT |
|---|---|---|
| SECOND COLUMN | 9 | FIFTH TO NINTH STAGES |
| THIRD COLUMN | 18 | ELEVENTH TO EIGHTEENTH STAGES |
| FOURTH COLUMN | 26 | SEVENTEENTH TO TWENTY-SIXTH STAGES |

FIG. 30

| IMAGE DATA | MODULATION DATA<br>BIT 31 · · · · · · · · · · · · · · · · BIT 0 |
|---|---|
| 0000 | 00000000000000000000000000000000 |
| 0001 | 00000000000000000000000000000011 |
| 0010 | 00000000000000000000000000001111 |
| 0011 | 00000000000000000000000000111111 |
| 0100 | 00000000000000000000000011111111 |
| 0101 | 00000000000000000000001111111111 |
| 0110 | 00000000000000000000111111111111 |
| 0111 | 00000000000000000011111111111111 |
| 1000 | 00000000000000001111111111111111 |
| 1001 | 00000000000000111111111111111111 |
| 1010 | 00000000000011111111111111111111 |
| 1011 | 00000000001111111111111111111111 |
| 1100 | 00000000111111111111111111111111 |
| 1101 | 00000011111111111111111111111111 |
| 1110 | 00001111111111111111111111111111 |
| 1111 | 00111111111111111111111111111111 |

FIG. 31

| CORRECTION DATA BIT 4 TO 0 | MODULATION DATA [31: 0] |
|---|---|
| 00000 | {MODULATION DATA A [31: 0]} |
| 00001 | {MODULATION DATA A [30: 0], {MODULATION DATA B [31]}} |
| 00010 | {MODULATION DATA A [29: 0], {MODULATION DATA B [31: 30]}} |
| 00011 | {MODULATION DATA A [28: 0], {MODULATION DATA B [31: 29]}} |
| 00100 | {MODULATION DATA A [27: 0], {MODULATION DATA B [31: 28]}} |
| 00101 | {MODULATION DATA A [26: 0], {MODULATION DATA B [31: 27]}} |
| 00110 | {MODULATION DATA A [25: 0], {MODULATION DATA B [31: 26]}} |
| 00111 | {MODULATION DATA A [24: 0], {MODULATION DATA B [31: 25]}} |
| 01000 | {MODULATION DATA A [23: 0], {MODULATION DATA B [31: 24]}} |
| 01001 | {MODULATION DATA A [22: 0], {MODULATION DATA B [31: 23]}} |
| 01010 | {MODULATION DATA A [21: 0], {MODULATION DATA B [31: 22]}} |
| 01011 | {MODULATION DATA A [20: 0], {MODULATION DATA B [31: 21]}} |
| 01100 | {MODULATION DATA A [19: 0], {MODULATION DATA B [31: 20]}} |
| 01101 | {MODULATION DATA A [18: 0], {MODULATION DATA B [31: 19]}} |
| 01110 | {MODULATION DATA A [17: 0], {MODULATION DATA B [31: 18]}} |
| 01111 | {MODULATION DATA A [16: 0], {MODULATION DATA B [31: 17]}} |
| 10000 | {MODULATION DATA A [15: 0], {MODULATION DATA B [31: 16]}} |
| 10001 | {MODULATION DATA A [14: 0], {MODULATION DATA B [31: 15]}} |
| 10010 | {MODULATION DATA A [13: 0], {MODULATION DATA B [31: 14]}} |
| 10011 | {MODULATION DATA A [12: 0], {MODULATION DATA B [31: 13]}} |
| 10100 | {MODULATION DATA A [11: 0], {MODULATION DATA B [31: 12]}} |
| 10101 | {MODULATION DATA A [10: 0], {MODULATION DATA B [31: 11]}} |
| 10110 | {MODULATION DATA A [9: 0], {MODULATION DATA B [31: 10]}} |
| 10111 | {MODULATION DATA A [8: 0], {MODULATION DATA B [31: 9]}} |
| 11000 | {MODULATION DATA A [7: 0], {MODULATION DATA B [31: 8]}} |
| 11001 | {MODULATION DATA A [6: 0], {MODULATION DATA B [31: 7]}} |
| 11010 | {MODULATION DATA A [5: 0], {MODULATION DATA B [31: 6]}} |
| 11011 | {MODULATION DATA A [4: 0], {MODULATION DATA B [31: 5]}} |
| 11100 | {MODULATION DATA A [3: 0], {MODULATION DATA B [31: 4]}} |
| 11101 | {MODULATION DATA A [2: 0], {MODULATION DATA B [31: 3]}} |
| 11110 | {MODULATION DATA A [1: 0], {MODULATION DATA B [31: 2]}} |
| 11111 | {MODULATION DATA A [0], {MODULATION DATA B [31: 1]}} |

METHOD OF MEASURING A DEVIATION IN TIMING OF A START OF WRITING IN SCANNING LINES, OPTICAL SCANNING DEVICE, AND IMAGE FORMING APPARATUS

CROSS-REFERENCE TO RELATED APPLICATIONS

The present application claims priority to and incorporates by reference the entire contents of Japanese Patent Application No. 2010-003679 filed in Japan on Jan. 12, 2010.

BACKGROUND OF THE INVENTION

1. Field of the Invention

The present invention relates to a measuring method, an optical scanning device, and an image forming apparatus, and more particularly to a measuring method for measuring a deviation in timing of start of writing in a plurality of scanning lines, an optical scanning device including a plurality of light-emitting elements, and an image forming apparatus including the optical scanning device.

2. Description of the Related Art

Image forming apparatuses such as laser printers and digital copiers have been required to perform image formation at a higher speed (increased speed) and to have a higher writing resolution (improved image quality). To meet these requirements, a technology for scanning a surface to be scanned with a plurality of light beams using a multi-beam light source has been proposed.

In a multi-beam light source including a plurality of light-emitting elements, the light-emitting elements are arranged so as to be displaced from one another in a direction corresponding to a main-scanning direction, so that the space between the scanning lines can be reduced. In such an arrangement, in order to align the positions of start of writing in a plurality of scanning lines, there is a need to control timing at which each of the light-emitting elements is turned on.

For example, Japanese Patent Application Laid-open No. 2003-276234 discloses an image forming apparatus having a control unit that determines the timing at which at least one of light-emitting elements in a light source unit is turned on, based on an image clock generated in synchronization with a detection signal from a synchronization detecting unit, and determines the timing at which the other light-emitting elements are turned on by changing a count of the image clock, and control turning on the light emitting elements in the light source unit.

After the image forming apparatus is shipped, optical characteristics of its optical components or the positional relationship between these optical components could change due to a temperature change or aging. Because of such a change, positions of light spots on the surface to be scanned could be displaced from desirable positions. This causes a displacement between positions of start of writing of image data with respect to the main-scanning direction, for example. It is difficult for the image forming apparatus disclosed in Japanese Patent Application Laid-open No. 2003-276234 to correct such a displacement between the positions of start of writing in real time and precisely.

SUMMARY OF THE INVENTION

It is an object of the present invention to at least partially solve the problems in the conventional technology.

According to one aspect of the present invention, there is provided a measuring method for measuring a deviation in timing of start of writing in a plurality of scanning lines using an optical scanning device that writes image information on a surface to be scanned by scanning the surface with a plurality of light beams along a plurality of scanning lines, the light beams being output from a plurality of light-emitting elements including a first light-emitting element and a second light-emitting element which are arranged so as to be displaced from each other in a direction corresponding to a direction of the scanning lines, the measuring method including: detecting timing at which light from the first light-emitting element is received by a light receiving element, as a first time, the light receiving element outputting a synchronization detecting signal before start of writing; detecting timing at which light from the second light-emitting element is received by the light receiving element, as a second time; and obtaining the deviation in timing of start of writing for the second light-emitting element with respect to the first light-emitting element based on a difference between the second time and the first time.

According to another aspect of the present invention, there is provided an optical scanning device that scans a surface to be scanned with a plurality of light beams along a plurality of scanning lines in a main-scanning direction, the optical scanning device including: a light source including a plurality of light-emitting elements that include a first light-emitting element and a second light-emitting element which are arranged so as to be displaced from each other in a direction corresponding to a direction of the scanning lines; an optical system that focuses a plurality of light beams from the light source onto the surface to be scanned, and moves a plurality of light spots on the surface to be scanned along the scanning lines in the main-scanning direction; a light receiving element on which light is incident before start of writing; and a control device that obtains a deviation in timing of start of writing in the scanning lines for the second light-emitting element with respect to the first light-emitting element, based on a difference between time at which light from the first light-emitting element is received by the light receiving element and time at which light from the second light-emitting element is received by the light receiving element.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 19 is a schematic view for explaining a relationship between image data and modulation data;

FIG. 20 is a schematic view for explaining a relationship between low four bits of correction data and modulation data output from a modulation data selecting circuit;

FIG. 21 is a timing chart for explaining an operation of the data creating and correcting circuit;

FIG. 25 is a first schematic view for explaining a variation of a delaying circuit;

FIG. 30 is a schematic view for explaining a relationship between modulation data and image data corresponding to FIG. 28;

FIG. 31 is a schematic view for explaining a relationship between modulation data output from a modulation data selecting circuit and low five bits of correction data corresponding to FIG. 28.

DETAILED DESCRIPTION OF THE PREFERRED EMBODIMENTS

Figure 1:
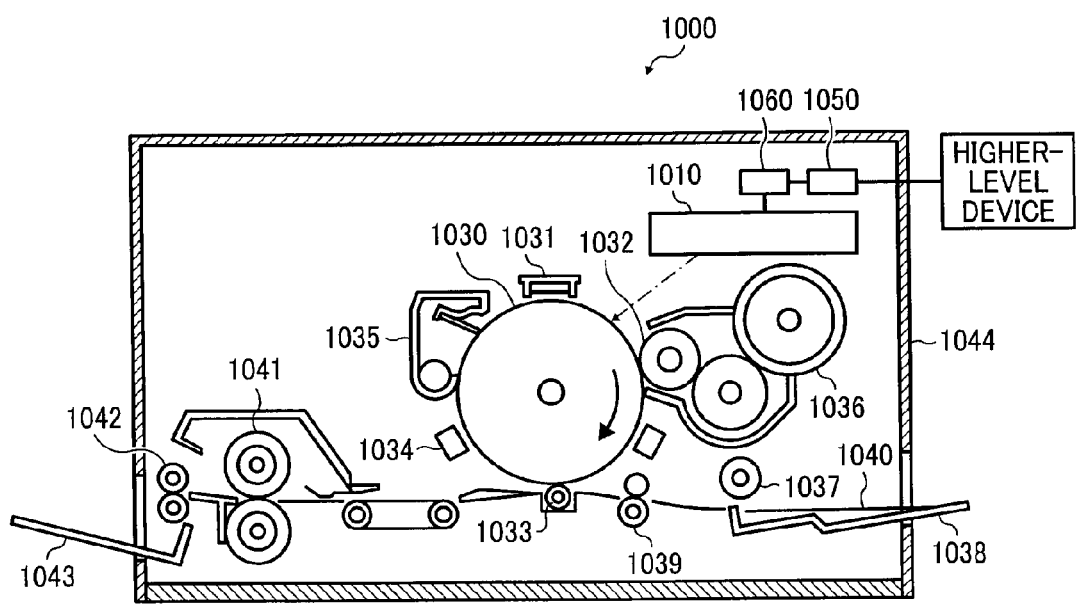
FIG. 1 is a schematic view for explaining a structure of a laser printer according to an embodiment of the present invention.

Preferred embodiments of the present invention will be described below with reference to FIGS. 1 to 24. FIG. 1 is a schematic diagram of a laser printer 1000 serving as an image forming apparatus according to an embodiment of the present invention.

The laser printer 1000 includes an optical scanning device 1010, a photosensitive drum 1030, an electric charger 1031, a developing roller 1032, a transfer charger 1033, a neutralization unit 1034, a cleaning unit 1035, a toner cartridge 1036, a feeding roller 1037, a paper feed tray 1038, a pair of registration rollers 1039, a fixing roller 1041, a discharging roller 1042, a discharge tray 1043, a communication control device 1050, and a printer control device 1060 that collectively controls each of the units described above. These are housed in a printer housing 1044 at predetermined positions.

The communication control device 1050 controls two-way communication between the laser printer 1000 and a higher-level device (a personal computer, for example) via a network or the like.

The photosensitive drum 1030 is a cylindrical member and has a photosensitive layer formed on the surface thereof. In other words, the surface of the photosensitive drum 1030 is a surface to be scanned. The photosensitive drum 1030 rotates in an arrow direction illustrated in FIG. 1.

The electric charger 1031, the developing roller 1032, the transfer charger 1033, the neutralization unit 1034, and the cleaning unit 1035 are arranged near the surface of the photosensitive drum 1030. The electric charger 1031, the developing roller 1032, the transfer charger 1033, the neutralization unit 1034, and the cleaning unit 1035 are arranged in this order along the rotation direction of the photosensitive drum 1030.

The electric charger 1031 uniformly charges the surface of the photosensitive drum 1030.

The optical scanning device 1010 irradiates the surface of the photosensitive drum 1030 charged by the electric charger 1031 with a light beam modulated based on image information received from the upper-level device. As a result, a latent image corresponding to the image information is formed on the surface of the photosensitive drum 1030. The latent image formed in this process moves in a direction of the developing roller 1032 according to the rotation of the photosensitive drum 1030. The structure of the optical scanning device 1010 is described later.

Toner is stored in the toner cartridge 1036 and is supplied to the developing roller 1032.

The developing roller 1032 makes the toner supplied from the toner cartridge 1036 adhere to the latent image formed on the surface of the photosensitive drum 1030 to visualize the image information. The latent image to which the toner is adhered (hereinafter, also referred to as a "toner image" for convenience) moves in a direction of the transfer charger 1033 according to the rotation of the photosensitive drum 1030.

The paper feed tray 1038 stores therein a recording sheet 1040. The feeding roller 1037 is arranged near the paper feed tray 1038, takes out the recording sheet 1040 from the paper feed tray 1038 one by one, and conveys the sheet to the pair of registration rollers 1039. The pair of registration rollers 1039 once holds the recording sheet 1040 taken out by the feeding roller 1037 and sends out the recording sheet 1040 into the gap between the photosensitive drum 1030 and the transfer charger 1033 according to the rotation of the photosensitive drum 1030.

Voltage having a polarity opposite to that of the toner is applied to the transfer charger 1033 in order to electrically attract the toner on the surface of the photosensitive drum 1030 to the recording sheet 1040. The toner image on the surface of the photosensitive drum 1030 is transferred onto the recording sheet 1040 with this voltage. The recording sheet 1040 transferred in this process is sent to the fixing roller 1041.

The fixing roller 1041 applies heat and pressure onto the recording sheet 1040, and thus, the toner is fixed on the recording sheet 1040. The recording sheet 1040 fixed in this process is sent to the discharge tray 1043 via the discharging roller 1042 and is sequentially stacked on the discharge tray 1043.

The neutralization unit 1034 neutralizes the surface of the photosensitive drum 1030.

The cleaning unit 1035 removes the toner (residual toner) remaining on the surface of the photosensitive drum 1030. The surface of the photosensitive drum 1030 from which the residual toner is removed returns to a position facing the electric charger 1031 again.

The structure of the optical scanning device 1010 is described below.

Figure 2:
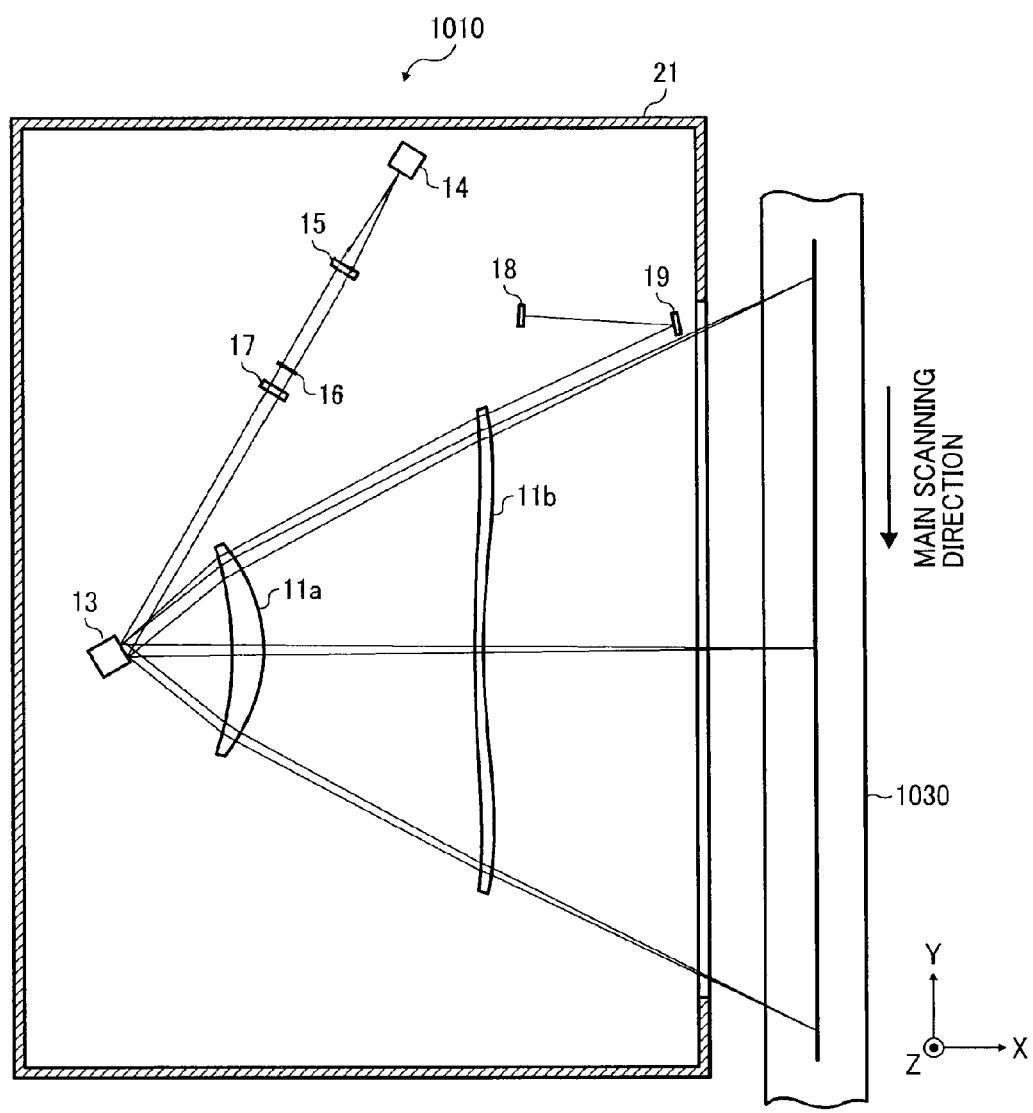
FIG. 2 is a schematic view of an optical scanning device illustrated in FIG. 1.
Figure 5:
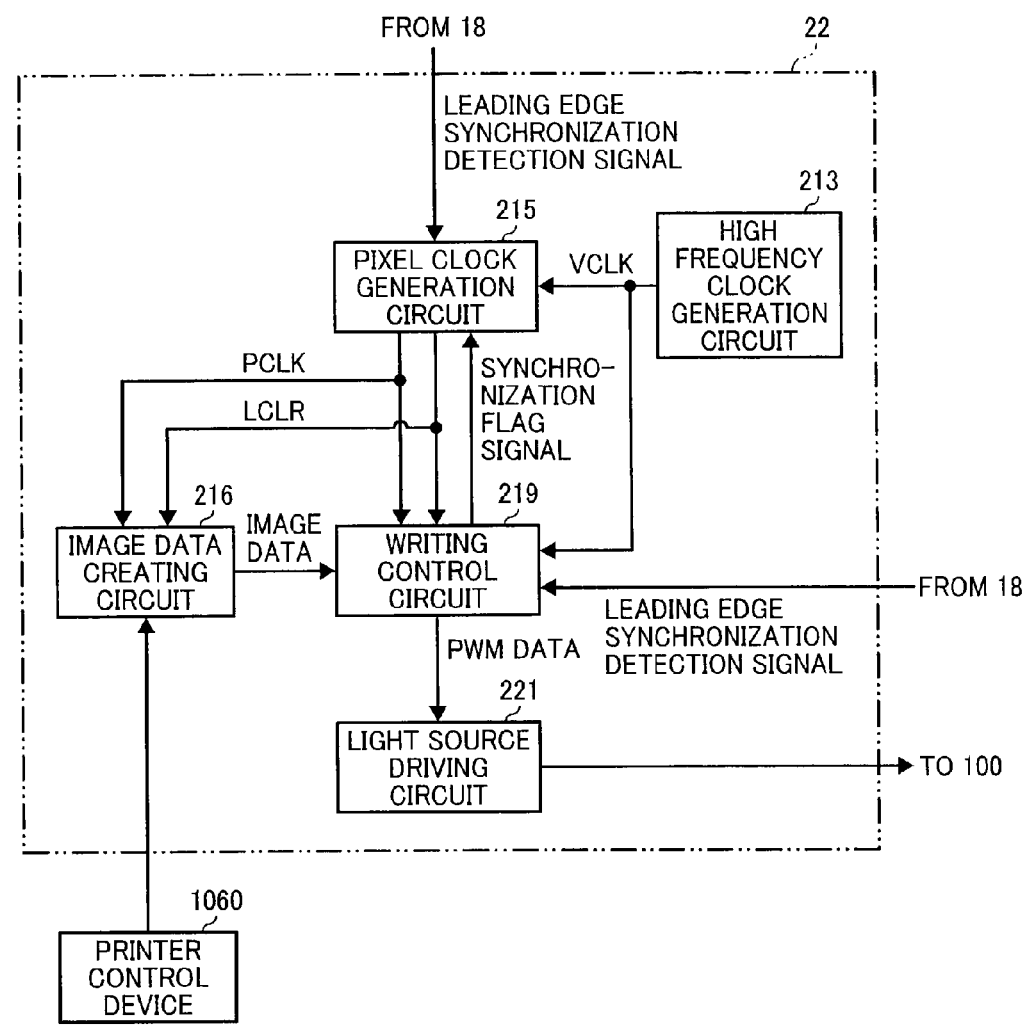
FIG. 5 is a block diagram for explaining a configuration of a scanning control device.

As illustrated in FIG. 2, the optical scanning device 1010 includes a light source 14, a coupling lens 15, an opening plate 16, a cylindrical lens 17, a polygon mirror 13, an fθ lens 11*a*, a troidal lens 11*b*, a photo detection sensor 18, a photo detection mirror 19, and a scanning control device 22 (omitted in FIG. 2; see FIG. 5). These units are housed in predetermined positions in a housing 21.

Hereinafter, in a three dimensional X-Y-Z Cartesian coordinate system, a direction along a longitudinal direction of the photosensitive drum 1030 is defined as a Y axis direction, and a direction along an optical axis of the fθ lens 11*a* and the troidal lens 11*b* is defined as an X axis direction. In addition, a direction corresponding to a main-scanning direction is simply referred to as a "main-scanning corresponding direction", and a direction corresponding to a sub-scanning direction is simply referred to as "sub-scanning corresponding direction" for the purpose of convenience.

Figure 3:
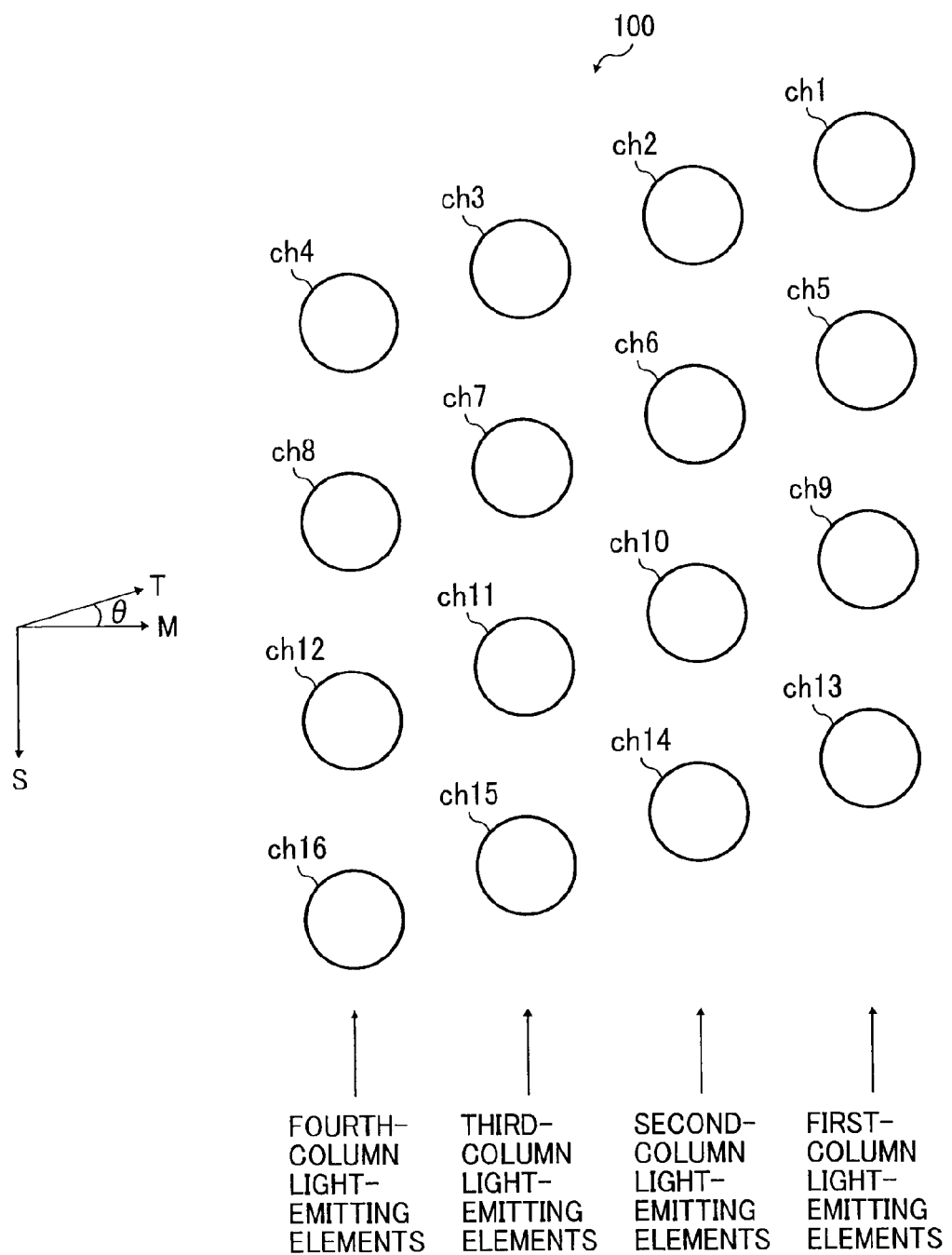
FIG. 3 is a schematic view for explaining a vertical cavity surface emitting laser array in a light source illustrated in FIG. 2.

The light source 14 includes, as illustrated in FIG. 3 as an example, a two-dimensional light-emitting element array 100 that is sixteen light-emitting elements (ch1 to ch16) arranged in a two dimensional array and formed on a single substrate. An M direction indicated in FIG. 3 corresponds to the main-scanning corresponding direction, and an S direction corresponds to the sub-scanning corresponding direction.

The light-emitting elements ch1, ch5, ch9, and ch13 are also referred to as first-column light-emitting elements; the light-emitting elements ch2, ch6, ch10, and ch14 are also referred to as second-column light-emitting elements; the light-emitting elements ch3, ch7, ch11, and ch15 are also referred to as third-column light-emitting elements; and the light-emitting elements ch4, ch8, ch12, and ch16 are also referred to as fourth-column light-emitting elements. These columns are arranged at equally-spaced intervals in the M direction, and the interval between the columns is set to 30 micrometers, for example.

The two-dimensional light-emitting element array 100 is arranged so that the intervals between the adjacent light-emitting elements are equal when all of the light-emitting elements are orthographically-projected onto a virtual line extending in the S direction. The "interval between the light-emitting elements" is herein defined as a distance between the centers of the two light-emitting elements. Therefore, the sixteen light beams can be used simultaneously to scan the surface of the photosensitive drum 1030.

Each of the light-emitting elements is a vertical cavity surface emitting laser (VCSEL) having an oscillation wavelength in a 780-nanometer band. In other words, the two-dimensional light-emitting element array 100 is a so-called surface emitting laser array.

Referring back to FIG. 2, the coupling lens 15 collimates the light beams from the light source 14 into approximate parallel beams.

The opening plate 16 has an opening portion, and sets the beam diameter of the light beams passed through the coupling lens 15.

The cylindrical lens 17 focuses the light beams traveled through the opening portion of the opening plate 16 onto a line in the Z axis direction in the vicinity of a deflecting reflective surface of the polygon mirror 13.

An optical system disposed on a light path between the light source 14 and the polygon mirror 13 is sometimes referred to as a pre-deflector optical system. In this embodiment, the pre-deflector optical system includes the coupling lens 15, the opening plate 16, and the cylindrical lens 17.

The polygon mirror 13 has four facets, each of which servers as a deflecting reflective surface. The polygon mirror 13 is rotated about an axis in parallel with the Z axis direction at a constant speed to deflect the light beams from the cylindrical lens 17.

The fθ lens 11*a* is disposed on the light paths of the light beams deflected on the polygon mirror 13.

The troidal lens 11*b* is disposed on the light paths of the light beams passed through the fθ lens 11*a*. The surface of the photosensitive drum 1030 is irradiated with the light beams passed through the troidal lens 11*b* to form light spots on the surface of the photosensitive drum 1030. The light spots move in the longitudinal direction of the photosensitive drum 1030 as the polygon mirror 13 is rotated. In other words, the surface of the photosensitive drum 1030 is scanned. The direction in which the light spots move corresponds to the "main-scanning direction". The direction in which the photosensitive drum 1030 is rotated corresponds to the "sub-scanning direction".

An optical system disposed on light paths between the polygon mirror 13 and the photosensitive drum 1030 is also referred to as a scanning optical system. In this embodiment, the scanning optical system includes the fθ lens 11*a* and the troidal lens 11*b*. At least one folding mirror may be disposed on at least one of the light paths between the fθ lens 11*a* and the troidal lens 11*b* and the light paths between the troidal lens 11*b* and the photosensitive drum 1030.

Figure 4:
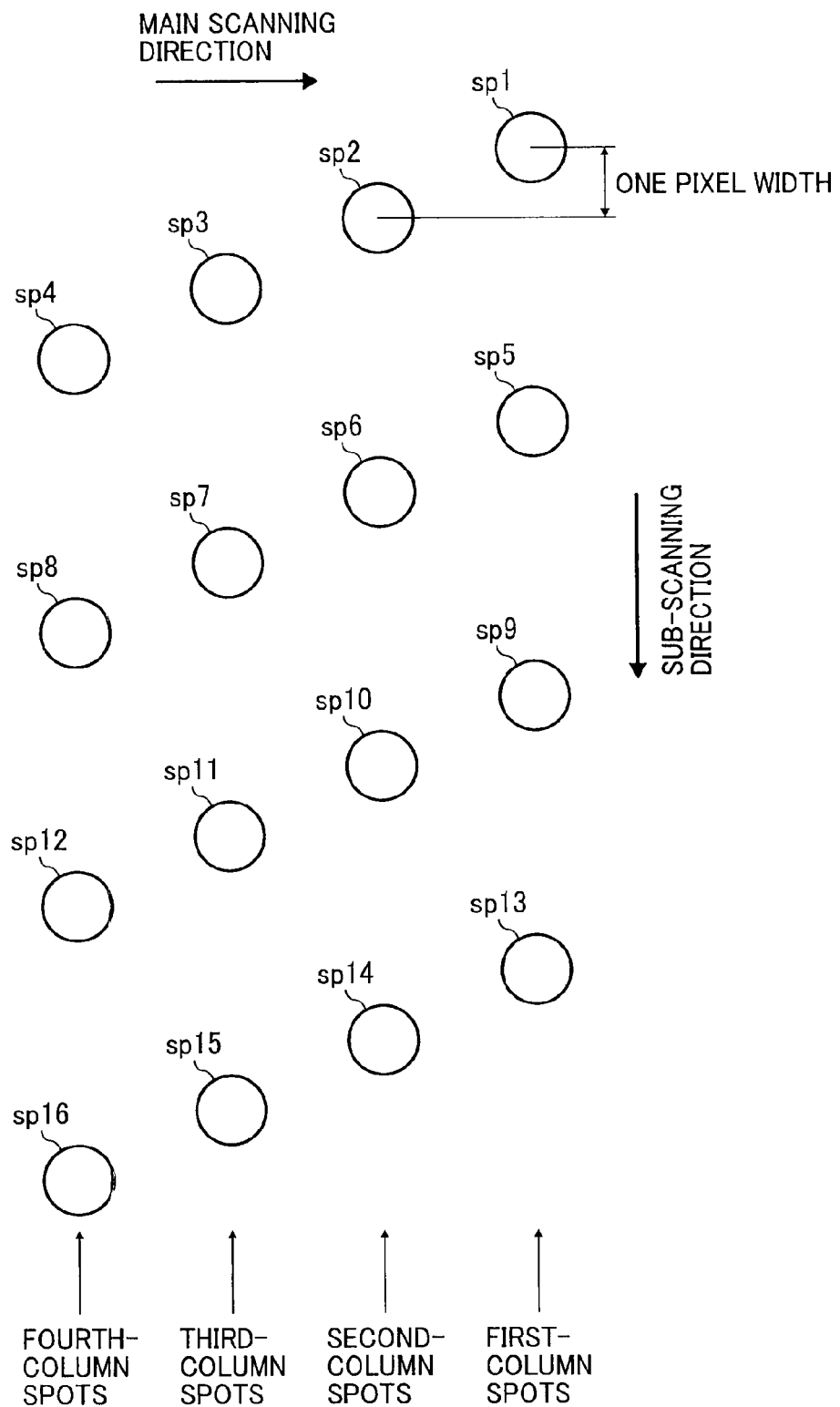
FIG. 4 is a schematic view for explaining light spots formed on a surface of a photosensitive drum.

In this embodiment, when the sixteen light-emitting elements (ch1 to ch16) are turned on simultaneously, a light spot sp1 of the light beam from the light-emitting element ch1, a light spot sp2 of the light beam from the light-emitting element ch2, a light spot sp3 of the light beam from the light-emitting element ch3, . . . , and a light spot sp16 of the light beam from the light-emitting element ch16 are formed on the surface of the photosensitive drum 1030 in the manner illustrated in FIG. 4.

The light spots sp1, sp5, sp9, and sp13 are also referred to as first-column spots; the light spots sp2, sp6, sp10, and sp14 are also referred to as second-column spots; the light spots sp3, sp7, sp11, and sp15 are also referred to as third-column spots; and the light spots sp4, sp8, sp12, and sp16 are also referred to as fourth-column spots.

Referring back to FIG. 2, a part of the light beams, which are deflected on the polygon mirror 13 and passed through the scanning optical system, is incident on the photo detection sensor 18 via the photo detection mirror 19 before start of writing in a single scan. The photo detection sensor 18 generates a signal (hereinafter, referred to as "leading edge synchronization detection signal") changing to "high level" when the amount of light received becomes equal to or less than a predetermined level and changing to "low level" when the amount of light received exceeds the predetermined level, and outputs the signal to the scanning control device 22.

The scanning control device 22 includes, as illustrated in FIG. 5 as an example, a high frequency clock generation circuit 213, a pixel clock generation circuit 215, an image data creating circuit 216, a writing control circuit 219, and a light source driving circuit 221. The arrows illustrated in FIG. 5 indicate flows of representative signals and information, but do not represent all of connections between the blocks.

Figure 6:
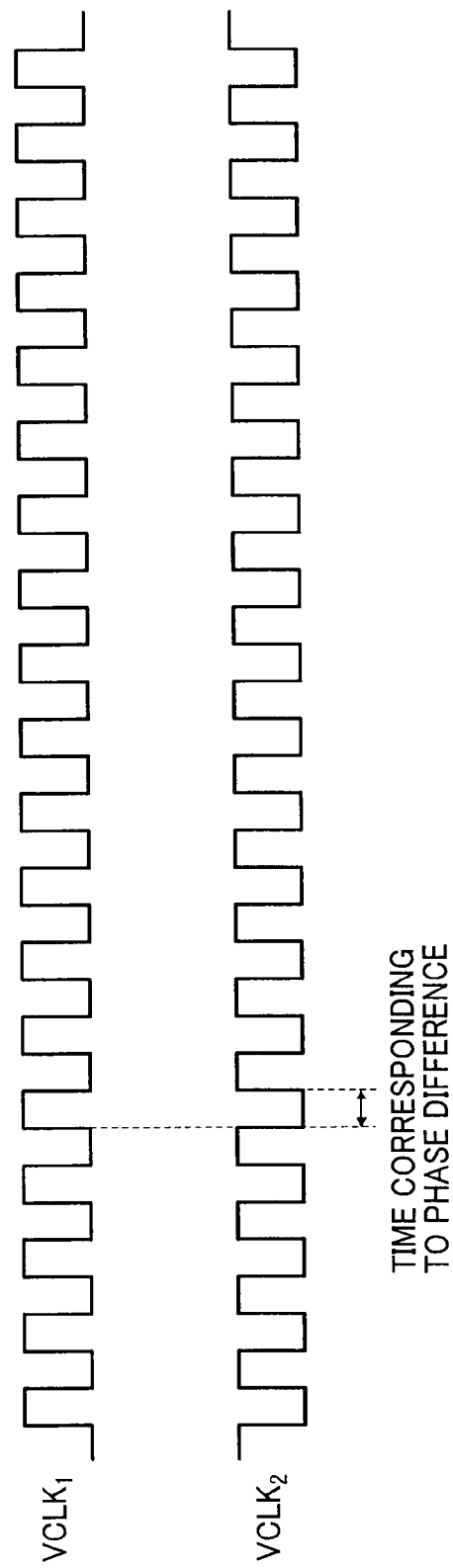
FIG. 6 is a waveform diagram for explaining two high frequency clock signals having different phases.

The high frequency clock generation circuit 213 generates a plurality of high frequency clock signals having different phases. As illustrated in FIG. 6 as an example, the high frequency clock generation circuit 213 generates two high frequency clock signals whose phase difference is 180 degrees ($VCLK_1$ and $VCLK_2$). Accordingly, the time corresponding to the phase difference between the high frequency clock signals $VCLK_1$ and $VCLK_2$ is a ½ cycle of these high frequency clock signals. Each of the high frequency clock signals generated by the high frequency clock generation circuit 213 is supplied to the pixel clock generation circuit 215 and the writing control circuit 219. Hereinafter, when these two high frequency clock signals do not need to be distinguished, these signals are collectively referred to as high frequency clock signals VCLK. Furthermore, hereinafter, the time corresponding to the phase difference between the high frequency clock signals $VCLK_1$ and $VCLK_2$ is also simply referred to "phase difference corresponding time" for convenience.

Figure 7:
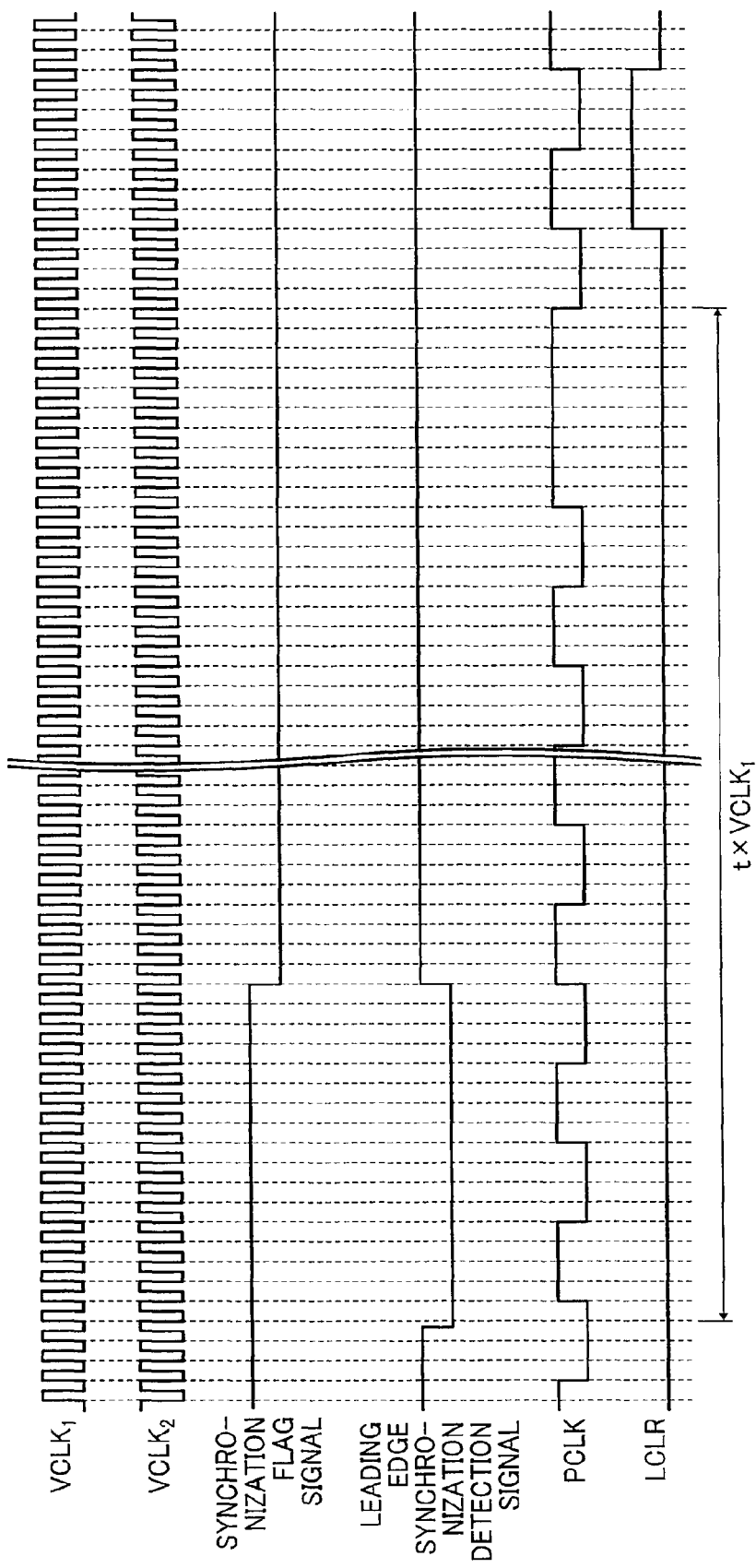
FIG. 7 is a timing chart for explaining an operation of a pixel clock generation circuit illustrated in FIG. 5.

The pixel clock generation circuit 215 generates a pixel clock signal PCLK to be used as a reference in outputting pixel (dot) data, based on the high frequency clock signal $VCLK_1$ from the high frequency clock generation circuit 213. In this example, as illustrated in FIG. 7 as an example, the pixel clock signal PCLK is a clock signal corresponding to eight cycles of the high frequency clock signal $VCLK_1$. The pixel clock generation circuit 215 also generates a line clear signal LCLR. The pixel clock signal PCLK and the line clear signal LCLR generated by the pixel clock generation circuit 215 is supplied to the image data creating circuit 216 and the writing control circuit 219 in synchronization with the leading edge synchronization detection signal.

More specifically, as illustrated in FIG. 7, when the leading edge synchronization detection signal changes from "high level" to "low level" while a synchronization flag signal is at "high level", the pixel clock generation circuit 215 outputs the pixel clock signal PCLK having a predetermined frequency in synchronization with "t"-th clock of the high frequency clock signal $VCLK_1$ counted from the timing of the rising edge of the high frequency clock signal $VCLK_1$ immediately after the change of the leading edge synchronization detection signal from "high level" to "low level".

In addition, the pixel clock generation circuit 215 changes the line clear signal LCLR from "low level" to "high level" at the timing of the first rising edge of the pixel clock signal PCLK which has the predetermined frequency and which is output at the timing explained above, and changes the line clear signal LCLR from "high level" to "low level" at the timing of the subsequent rising edge of the pixel clock signal PCLK.

In this example, the value "t" is set so that the pixel clock signal PCLK is synchronized with the high frequency clock signal $VCLK_1$ after enough time is ensured for the synchronization detection signals for the other light-emitting elements to be detected, instead of being synchronized with the high frequency clock signal $VCLK_1$ immediately after the leading edge synchronization detection signal changes from "high level" to "low level".

Figure 8:
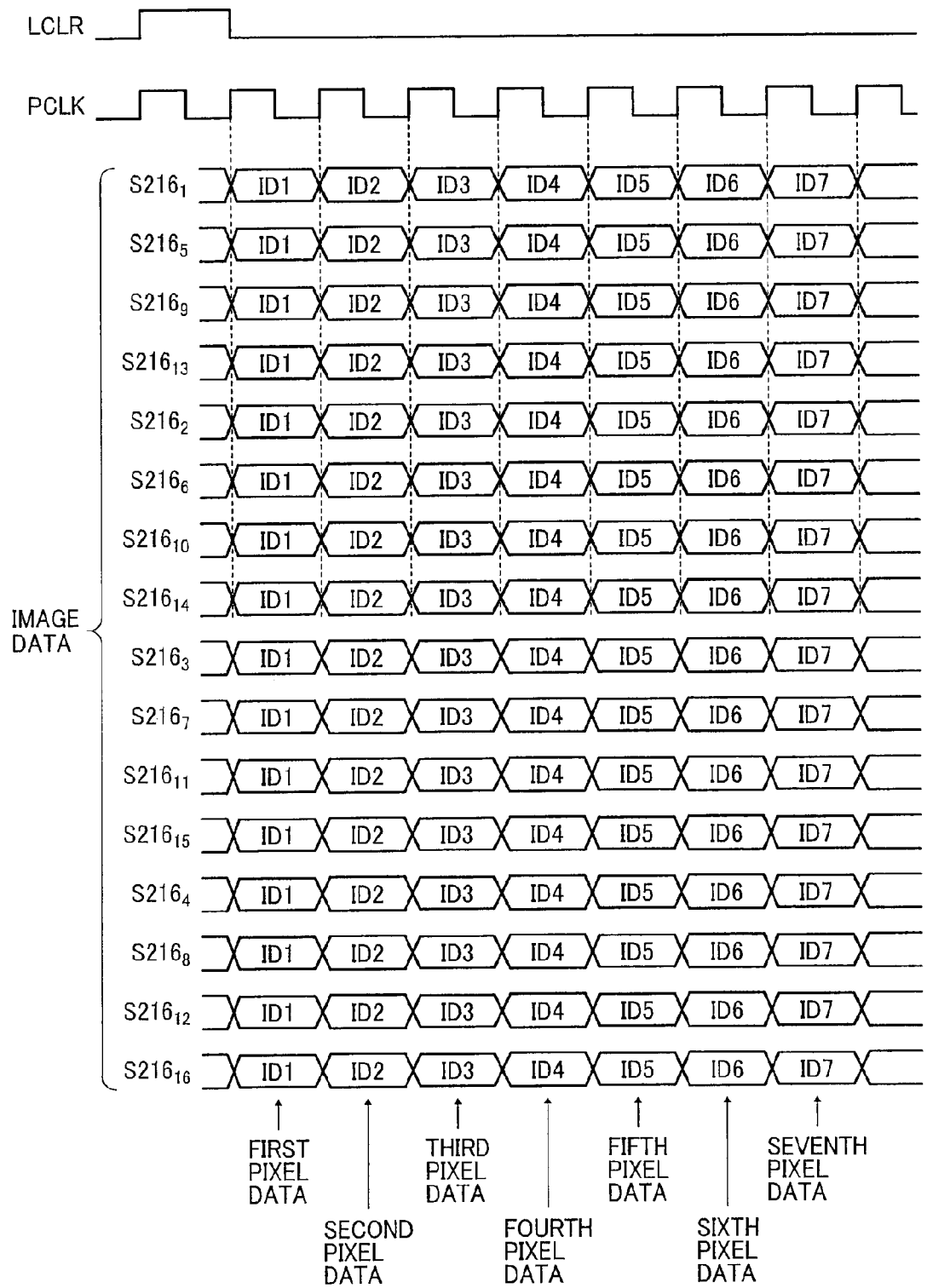
FIG. 8 is a timing chart for explaining an operation of an image data creating circuit illustrated in FIG. 5.

Referring back to FIG. 5, the image data creating circuit 216 rasterizes image information received from a higher-level device via the printer control device 1060, performs predetermined processes such as halftone processing, and creates image data with reference to the pixel clock signal PCLK for each of the light-emitting elements such that each pixel is expressed in gradation. When the image data creating circuit 216 detects a change in the line clear signal LCLR from "low level" to "high level", the image data creating circuit 216 outputs the image data ($S216_1$ to $S216_{16}$) sequentially from first pixel data (ID1), to the writing control circuit 219 in synchronization with the timing of a rising edge of the pixel clock signal PCLK as illustrated in FIG. 8 as an example. In this example, it is assumed that one-pixel data corresponds to four-bit data. Image data $S216_1$ is the image data corresponding to the light-emitting element ch1; image data $S216_2$ is the image data corresponding to the light-emitting element ch2; . . .; and image data $S216_{16}$ is the image data corresponding to the light-emitting element ch16.

Figure 9:
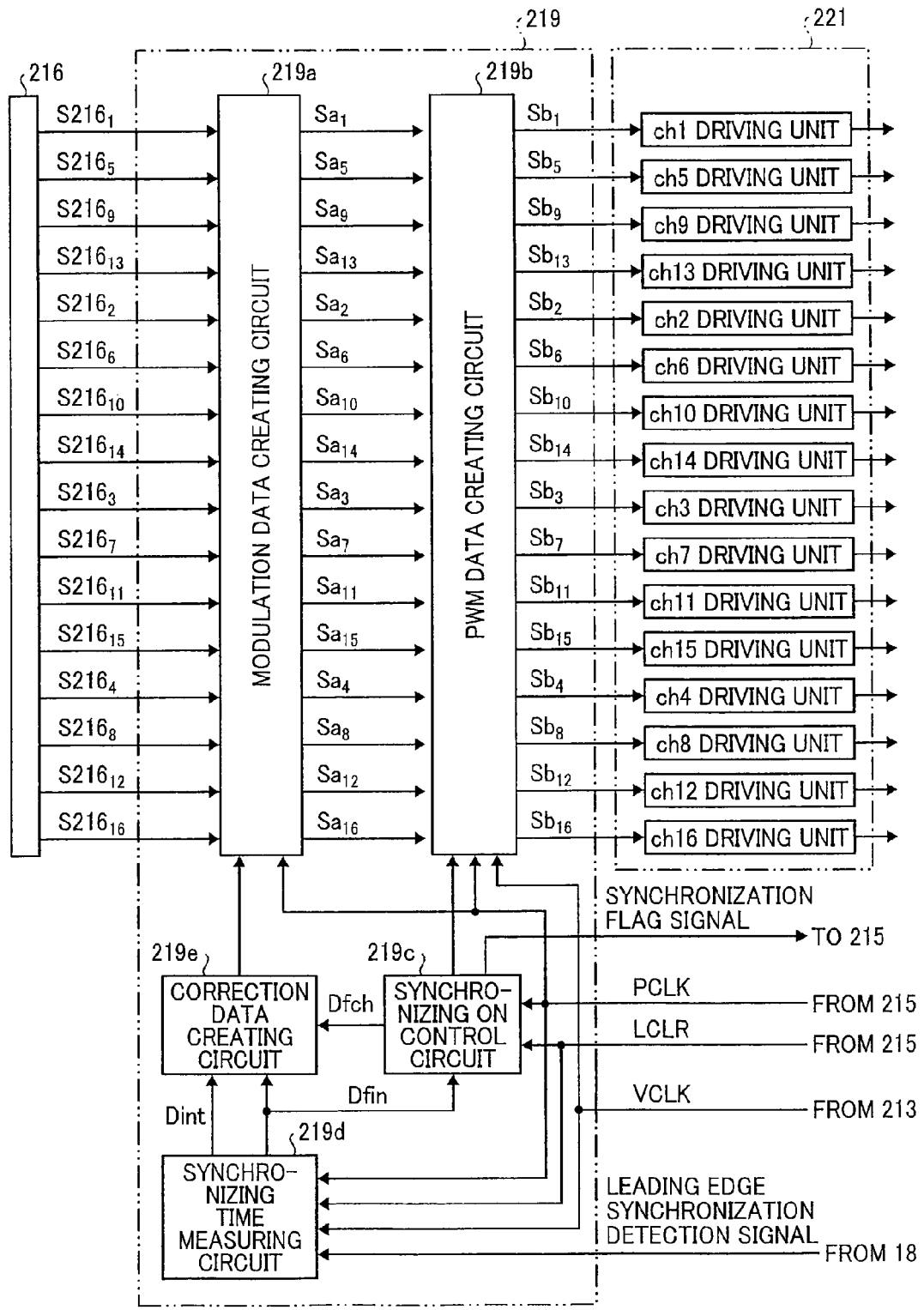
FIG. 9 is a schematic view for explaining a configuration of a writing control circuit illustrated in FIG. 5.

The writing control circuit 219 includes, as illustrated in FIG. 9 as an example, a modulation data creating circuit 219a, a pulse-width modulation (PWM) data creating circuit 219b, a synchronizing ON control circuit 219c, a synchronizing time measuring circuit 219d, and a correction data creating circuit 219e.

The synchronizing time measuring circuit 219d has two counters (a first counter and a second counter), measures a time interval between the timing of a change in the line clear signal LCLR and the timing of a subsequent change in the leading edge synchronization detection signal, and outputs the measurement data Dint to the correction data creating circuit 219e. The synchronizing time measuring circuit 219d also outputs a measurement end signal Dfin for notifying the end of the measurement, to the synchronizing ON control circuit 219c and the correction data creating circuit 219e.

Figure 10:
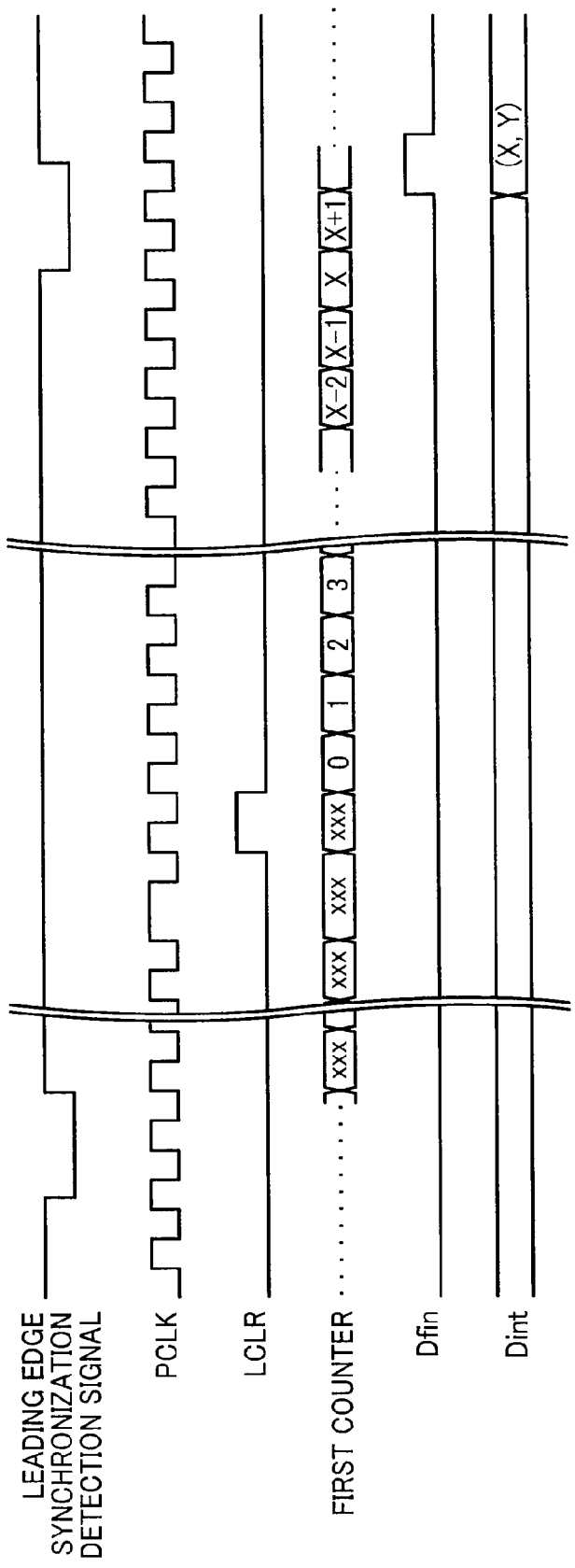
FIG. 10 is a first timing chart for explaining an operation of a synchronizing time measuring circuit illustrated in FIG. 9.
Figure 11:
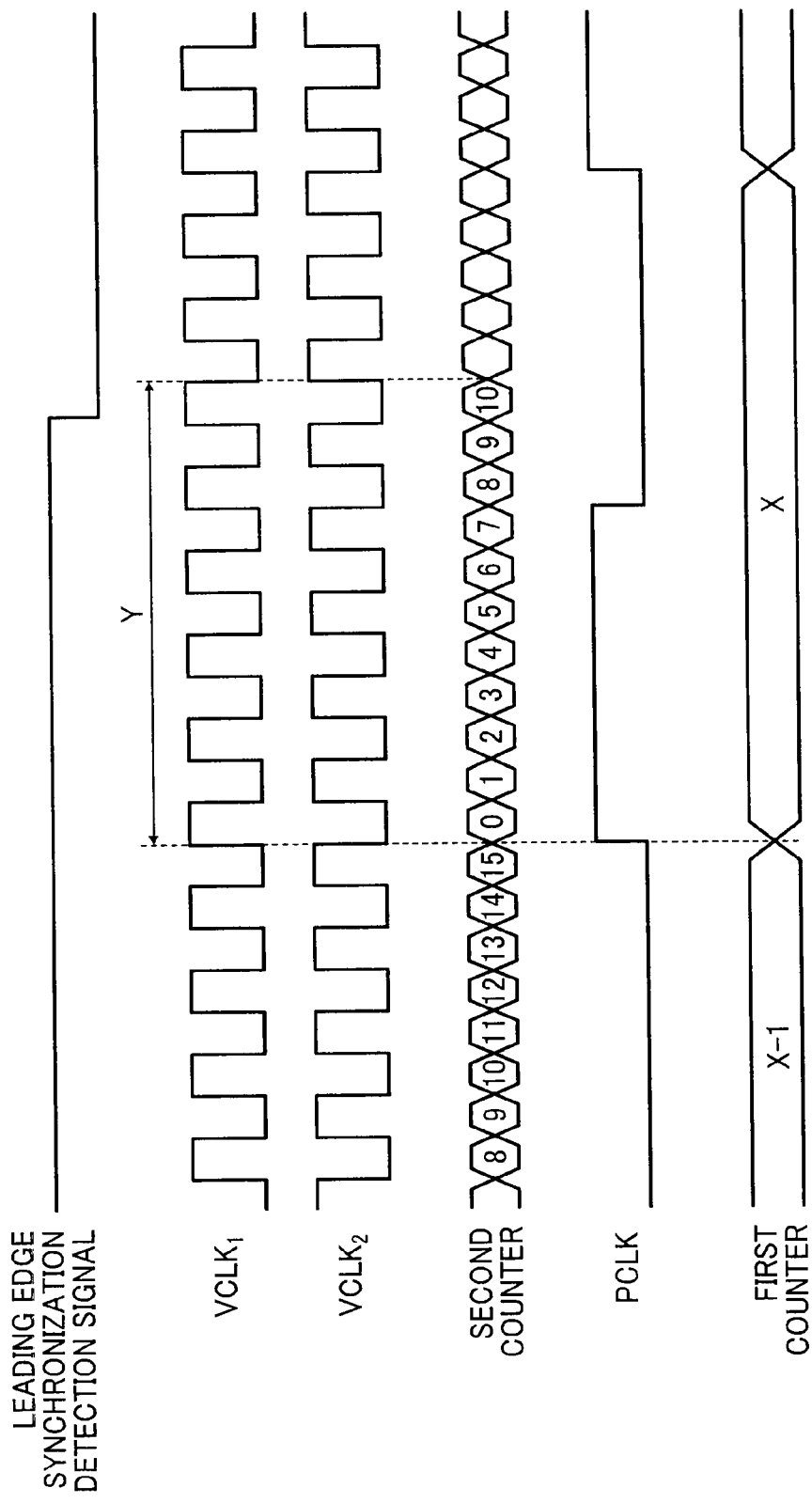
FIG. 11 is a second timing chart for explaining the operation of the synchronizing time measuring circuit illustrated in FIG. 9.

An operation of the synchronizing time measuring circuit 219d will now be explained with reference to the timing charts illustrated in FIGS. 10 and 11. FIG. 11 is a detailed timing chart in the vicinity of the second falling edge of the leading edge synchronization detection signal illustrated in FIG. 10.

(1-1) When the line clear signal LCLR changes from "low level" to "high level", the synchronizing time measuring circuit 219d resets both of a count value in the first counter and a count value in the second counter to zero at the timing of the subsequent rising edge of the pixel clock signal PCLK. The count value in the first counter is incremented in synchronization with the timing of the rising edges of the pixel clock signal PCLK. The count value in the second counter is incremented in synchronization with the timing of the rising edges of the high frequency clock signal $VCLK_1$ and the high frequency clock signal $VCLK_2$ (see FIG. 11).

(1-2) The synchronizing time measuring circuit 219d then obtains the count value in the first counter and the count value in the second counter at the moment when the leading edge synchronization detection signal changes from "high level" to "low level". In FIG. 11, the count value in the first counter is indicated to be "X", and the count value in the second counter is indicated to be "10".

(1-3) The synchronizing time measuring circuit 219d then outputs the count value in the first counter and the count value in the second counter to the correction data creating circuit 219e as the measurement data Dint. The synchronizing time measuring circuit 219d also changes the measurement end signal Dfin from "low level" to "high level" at the same time as the measurement data Dint is output. Hereinafter, the content of the measurement data Dint will be indicated in a format as follows: (the count value in the first counter, the count value in the second counter).

(1-4) The synchronizing time measuring circuit 219d changes the measurement end signal Dfin from "high level"

to "low level" in synchronization with the timing of the subsequent rising edge of the pixel clock signal PCLK.

In this example, the time interval can be measured in the precision of a half clock of the high frequency clock VCLK.

Referring back to FIG. 9, the synchronizing ON control circuit 219c selects the light-emitting element(s) for emitting light to be detected by the photo detection sensor 18 (hereinafter, also referred to as "leading edge synchronized light-emitting element(s)" for convenience), and generates a plurality of synchronizing ON signals (ch1 synchronizing ON signal to ch16 synchronizing ON signal) to cause the selected light-emitting element(s) to be turned on. The generated synchronizing ON signals are output to the PWM data creating circuit 219b. The ch1 synchronizing ON signal corresponds to the light-emitting element ch1; the ch2 synchronizing ON signal corresponds to the light-emitting element ch2; . . . ; and the ch16 synchronizing ON signal corresponds to the light-emitting element ch16.

The synchronizing ON control circuit 219c also notifies the correction data creating circuit 219e of synchronizing ch information Dfch for identifying the leading edge synchronized light-emitting element(s).

The synchronizing ON control circuit 219c also outputs the synchronization flag signal to the pixel clock generation circuit 215 at the same time as the synchronizing ON signals are output when performing a synchronizing ON operation for synchronizing the pixel clock PCLK.

Figure 12:
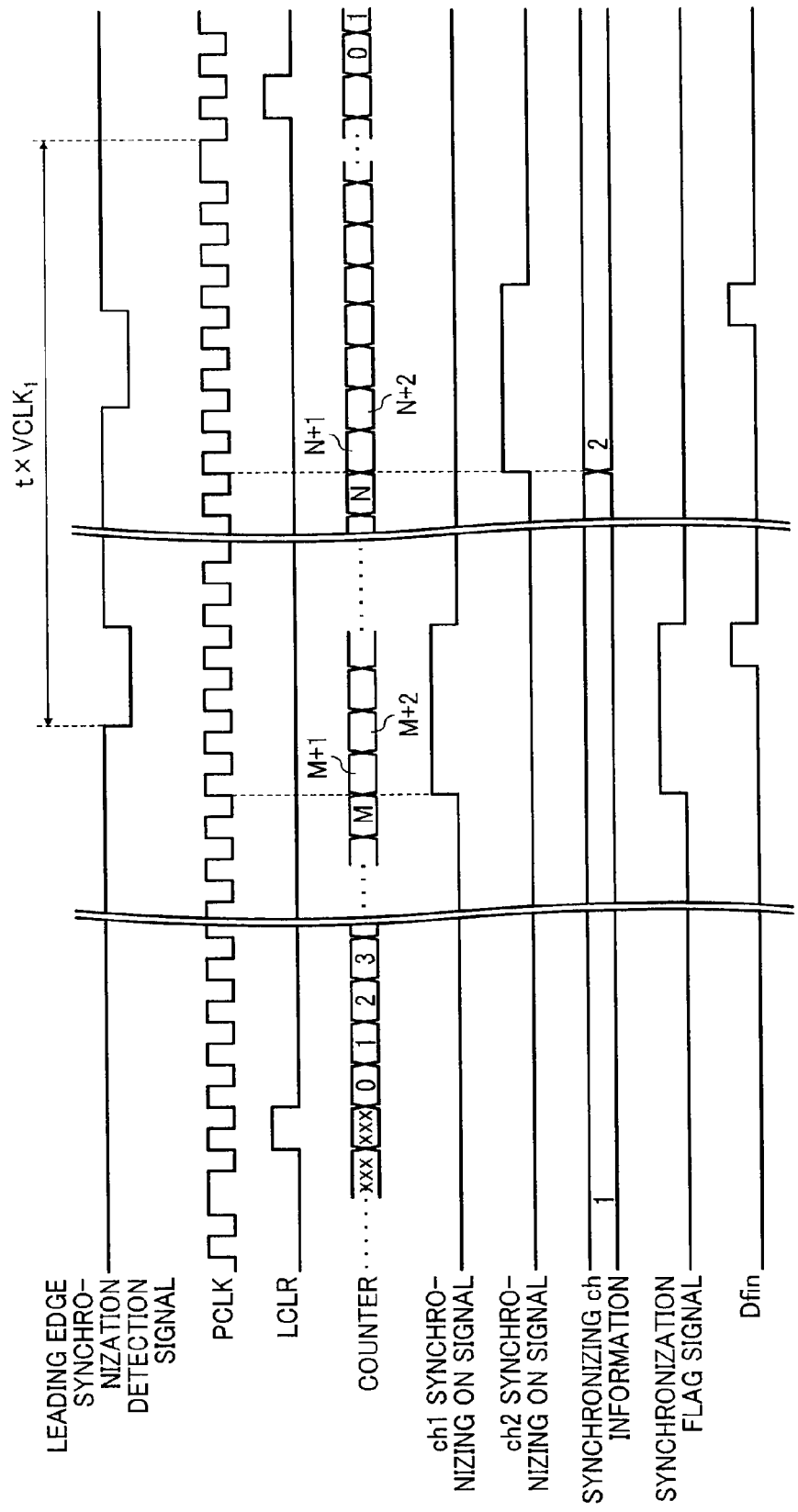
FIG. 12 is a timing chart for explaining an operation of a synchronizing ON control circuit illustrated in FIG. 9.

The operation of the synchronizing ON control circuit 219c will now be explained with reference to the timing chart illustrated in FIG. 12. In this example, it is assumed that the leading edge synchronized light-emitting elements are the light-emitting element ch1 and the light-emitting element ch2.

(2-1) When the line clear signal LCLR changes from "low level" to "high level", the synchronizing ON control circuit 219c resets a count value in an internal counter to zero in synchronization with the timing of a subsequent rising edge of the pixel clock signal PCLK. The count value in the counter is incremented in synchronization with the timing of the rising edges of the pixel clock signal PCLK.

(2-2) When the count value in the counter reaches a predetermined number (M, in this example), the synchronizing ON control circuit 219c changes the ch1 synchronizing ON signal from "low level" to "high level". In this manner, the light-emitting element ch1 is turned on. At the same time, the synchronizing ON control circuit 219c notifies "1" as the synchronizing ch information Dfch. The ch2 synchronizing ON signal to the ch16 synchronizing ON signal are all kept at "low level".

At the same time, the synchronizing ON control circuit 219c changes the synchronization flag signal from "low level" to "high level". In response, the pixel clock generation circuit 215 synchronizes the pixel clock signal PCLK with the "t"-th clock of the high frequency clock signal $VCLK_1$ counted from the timing of the rising edge of the high frequency clock signal $VCLK_1$ immediately after the leading edge synchronization detection signal is changed from "high level" to "low level".

(2-3) When the measurement end signal Dfin output from the synchronizing time measuring circuit 219d changes from "low level" to "high level", the synchronizing ON control circuit 219c changes the ch1 synchronizing ON signal from "high level" to "low level" at the timing of the subsequent rising edge of the pixel clock signal PCLK. In this manner, the light-emitting element ch1 is turned off. The synchronizing ON control circuit 219c also changes the synchronization flag signal from "high level" to "low level".

(2-4) When the count value in the counter reaches a predetermined value (N, in this example), the synchronizing ON control circuit 219c changes the ch2 synchronizing ON signal from "low level" to "high level". In this manner, the light-emitting element ch2 is turned on. At the same time, the synchronizing ON control circuit 219c notifies "2" as the synchronizing ch information Dfch. The ch1 synchronizing ON signal, and the ch3 synchronizing ON signal to the ch16 synchronizing ON signal are all kept at "low level".

(2-5) When the measurement end signal Dfin output from the synchronizing time measuring circuit 219d changes from "low level" to "high level", the synchronizing ON control circuit 219c changes the ch2 synchronizing ON signal from "high level" to "low level" at the timing of the subsequent rising edge of the pixel clock signal PCLK. In this manner, the light-emitting element ch2 is turned off.

Referring back to FIG. 9, the correction data creating circuit 219e creates correction data for each of the light-emitting elements based on the measurement data Dint, the measurement end signal Dfin, and the synchronizing ch information Dfch.

Figure 13:
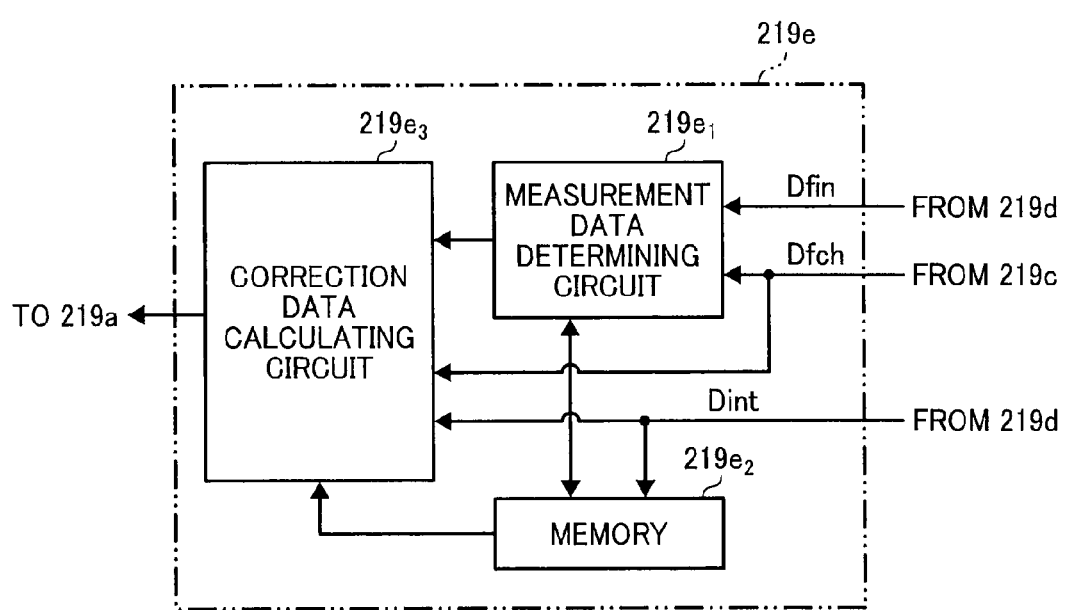
FIG. 13 is a schematic view for explaining a configuration of a correction data creating circuit illustrated in FIG. 9.

In this example, the correction data creating circuit 219e includes a measurement data determining circuit $219e_1$, a memory $219e_2$, and a correction data calculating circuit $219e_3$ as illustrated in FIG. 13.

When the measurement data determining circuit $219e_1$ detects the end of the measurement based on the measurement end signal Dfin, the measurement data determining circuit $219e_1$ determines if the light-emitting element identified by the synchronizing ch information Dfch is a reference light-emitting element (in this example, ch1). If the light-emitting element identified by the synchronizing ch information Dfch is the reference light-emitting element, the measurement data determining circuit $219e_1$ stores the received measurement data Dint in the memory $219e_2$ as "reference data". On the contrary, if the light-emitting element identified by the synchronizing ch information Dfch is a light-emitting element other than the reference light-emitting element, the measurement data determining circuit $219e_1$ instructs the correction data calculating circuit $219e_3$ to calculate correction data.

Based on the instruction from the measurement data determining circuit $219e_1$, the correction data calculating circuit $219e_3$ calculates a difference between the "reference data" stored in the memory $219e_2$ and the measurement data Dint at the time, as correction data Dmod for the light-emitting element identified by the synchronizing ch information Dfch. For example, assuming that the reference data stored in the memory $219e_2$ is (X1, Y1) and the measurement data Dint at that time is (X2, Y2), the correction data Dmod is given by Equation (1). "16" in Equation (1) represents that one cycle of the pixel clock signal (hereinafter, also referred to as "one pixel clock") corresponds to one half of a cycle of the high frequency clock signal (hereinafter, also referred to as "½ high frequency clock") times sixteen.

$$D\bmod = (X1\times16 + Y1) - (X2\times16 + Y2) \qquad (1)$$

Assuming that the correction data Dmod obtained from Equation (1) is expressed in a 11-bit binary number, for example, low four bits (bit 3 to bit 0) represent a value in units of ½ high frequency clock, and high seven bits (bit 10 to bit 4) represent a value in units of one pixel clock.

Figure 14:
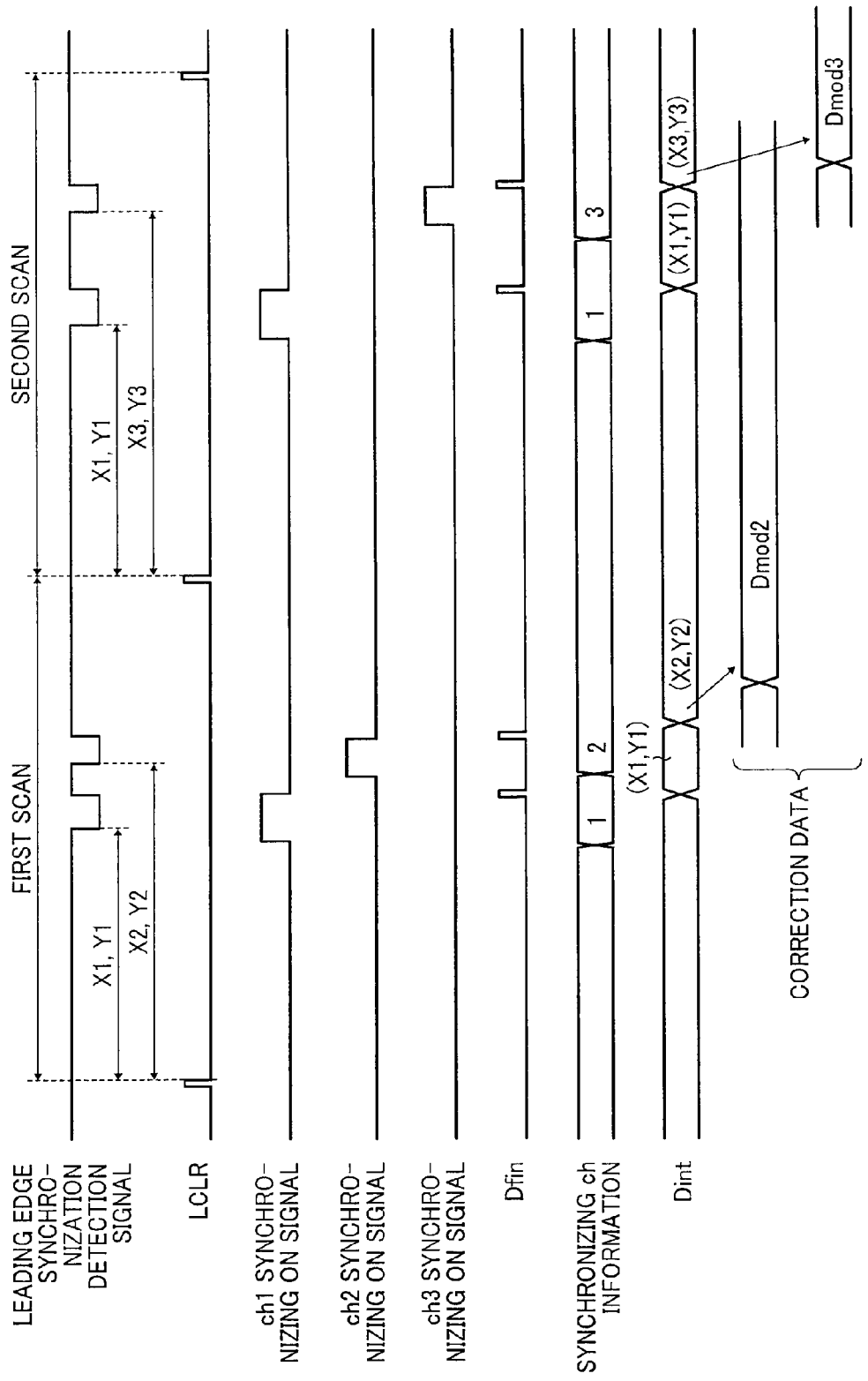
FIG. 14 is a timing chart for explaining an operation of the correction data creating circuit.

A specific operation of the correction data creating circuit 219e will now be explained with reference to the timing chart illustrated in FIG. 14. In this example, the reference light-emitting element is the light-emitting element ch1 in all of a first to a fifteenth scans, and the light-emitting element for which the correction data is calculated is the light-emitting element ch2 in the first scan, the light-emitting element ch3 in the second scan, the light-emitting element ch4 in the third scan, . . . , and the light-emitting element ch16 in the fifteenth scan. FIG. 14 shows the first and second scans only due to limitations of space.

(3-1) During the first scan, upon detecting the end of the first measurement from the measurement end signal Dfin, the correction data creating circuit 219e determines if the light-emitting element identified by the synchronizing ch information Dfch is ch1. In this example, because the light-emitting element identified by the synchronizing ch information Dfch is the light-emitting element ch1, the received measurement data (in this example, (X1, Y1)) is stored as the "reference data".

(3-2) During the first scan, upon detecting the end of the next measurement from the measurement end signal Dfin, the correction data creating circuit 219e determines if the light-emitting element identified by the synchronizing ch information Dfch is ch1. In this example, because the light-emitting element identified by the synchronizing ch information Dfch is ch2, the correction data creating circuit 219e calculates the difference between the "reference data" (X1, Y1) and received measurement data (in this example, (X2, Y2)), and outputs the calculation result as correction data Dmod2 for the light-emitting element ch2. The correction data Dmod2 corresponds to the interval between the light spot of the light-emitting element ch1 and the light spot of the light-emitting element ch2.

(3-3) During the second scan, upon detecting the end of the first measurement from the measurement end signal Dfin, the correction data creating circuit 219e determines if the light-emitting element identified by the synchronizing ch information Dfch is ch1. In this example, because the light-emitting element identified by the synchronizing ch information Dfch is the light-emitting element ch1, the received measurement data (in this example, (X1, Y1)) is stored as the "reference data".

(3-4) During the second scan, upon detecting the end of the next measurement from the measurement end signal Dfin, the correction data creating circuit 219e determines if the light-emitting element identified by the synchronizing ch information Dfch is ch1. In this example, because the light-emitting element identified by the synchronizing ch information Dfch is ch3, the correction data creating circuit 219e calculates the difference between the "reference data" (X1, Y1) and received measurement data (in this example, (X3, Y3)), and outputs the calculation result as correction data Dmod3 for the light-emitting element ch3. The correction data Dmod3 corresponds to the interval between the light spot of the light-emitting element ch1 and the light spot of the light-emitting element ch3.

Subsequently, during the third to the fifteenth scans, upon detecting the end of a measurement from the measurement end signal Dfin, the correction data creating circuit 219e outputs correction data for the light-emitting elements ch4 to ch16 (Dmod4 to Dmod16) in the same manner.

The correction data is obtained before actual writing is performed, and the writing is performed using the correction data thus obtained. Furthermore, the correction data may be obtained in any other time.

Figure 15:
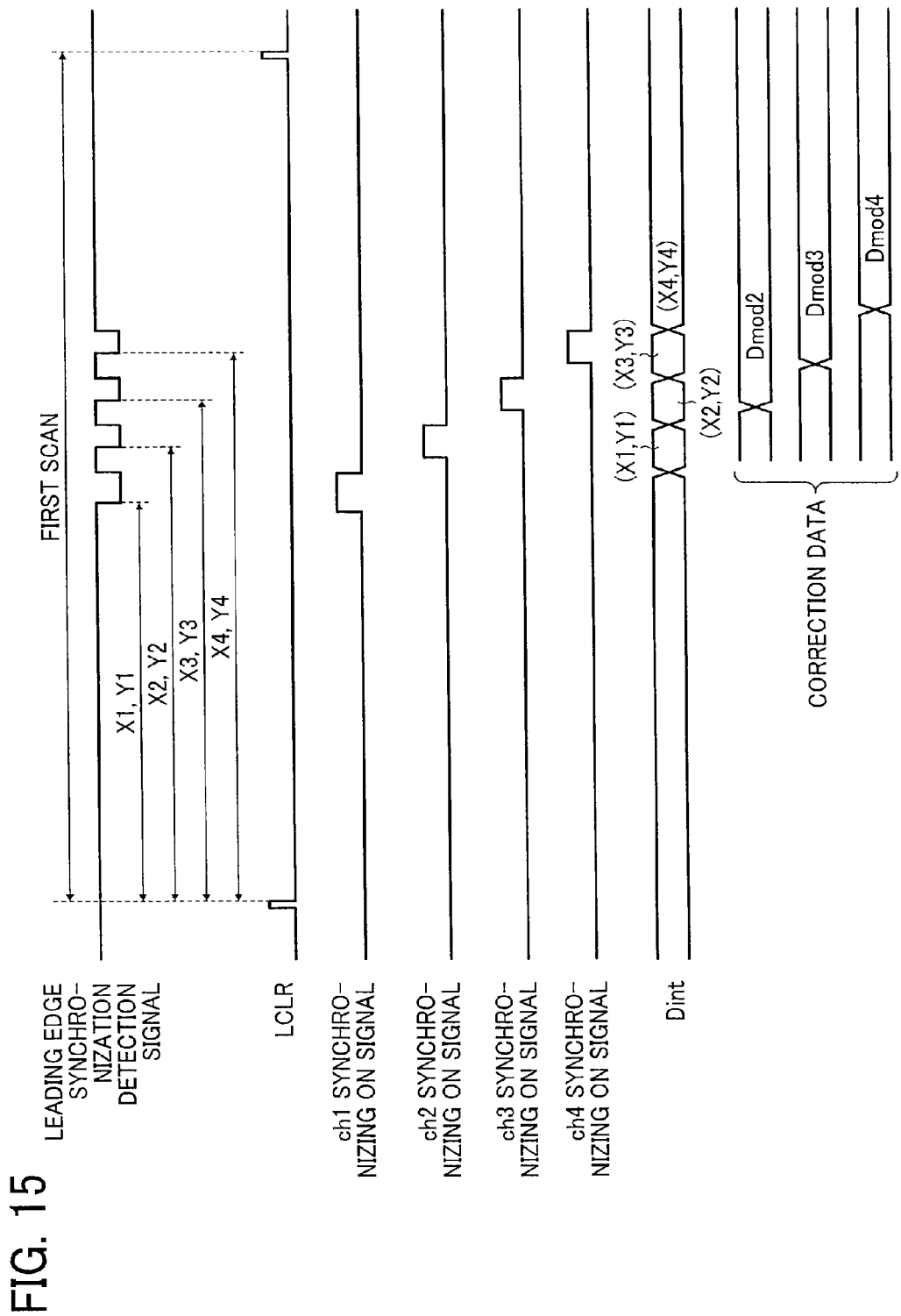
FIG. 15 is a timing chart for explaining a variation of the operation of the synchronizing ON control circuit.

Alternatively, correction data for a plurality of light-emitting elements may be obtained in a single scan as illustrated in FIG. 15 as an example.

Figure 16:
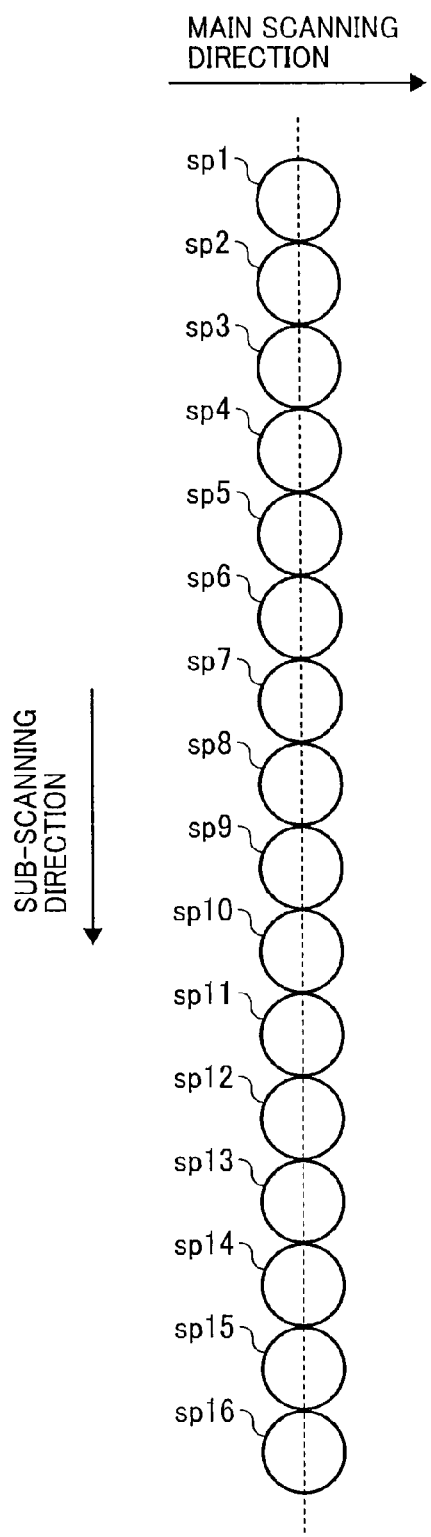
FIG. 16 is a schematic view for explaining positions of light spots formed on the surface of the photosensitive drum at the start of writing.

Referring back to FIG. 9, the modulation data creating circuit 219a converts the image data ($S216_1$ to $S216_{16}$) received from the image data creating circuit 216 into modulation data ($Sa_1$ to $Sa_{16}$). The modulation data creating circuit 219a also corrects timing of outputting the modulation data ($Sa_1$ to $Sa_{16}$) based on the received correction data (Dmod1 to Dmod16). In this manner, the light spots (sp1 to sp16) of the light-emitting elements at the start of writing can be aligned at the same position in the main-scanning direction on the photosensitive drum 1030 as illustrated in FIG. 16.

Figure 17A:
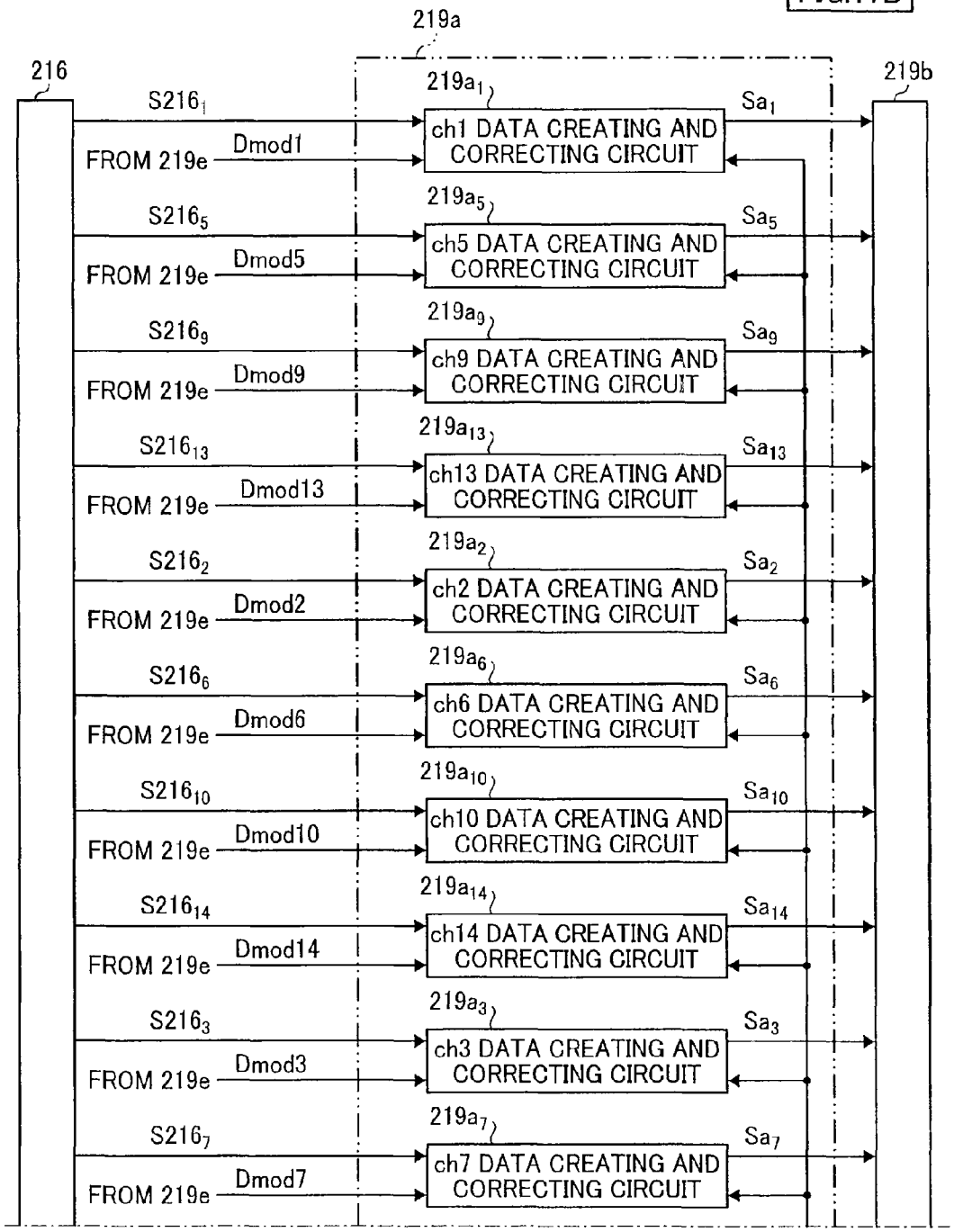
FIG. 17 is a schematic view for explaining a configuration of a modulation data creating circuit illustrated in FIG. 9.
Figure 17B:
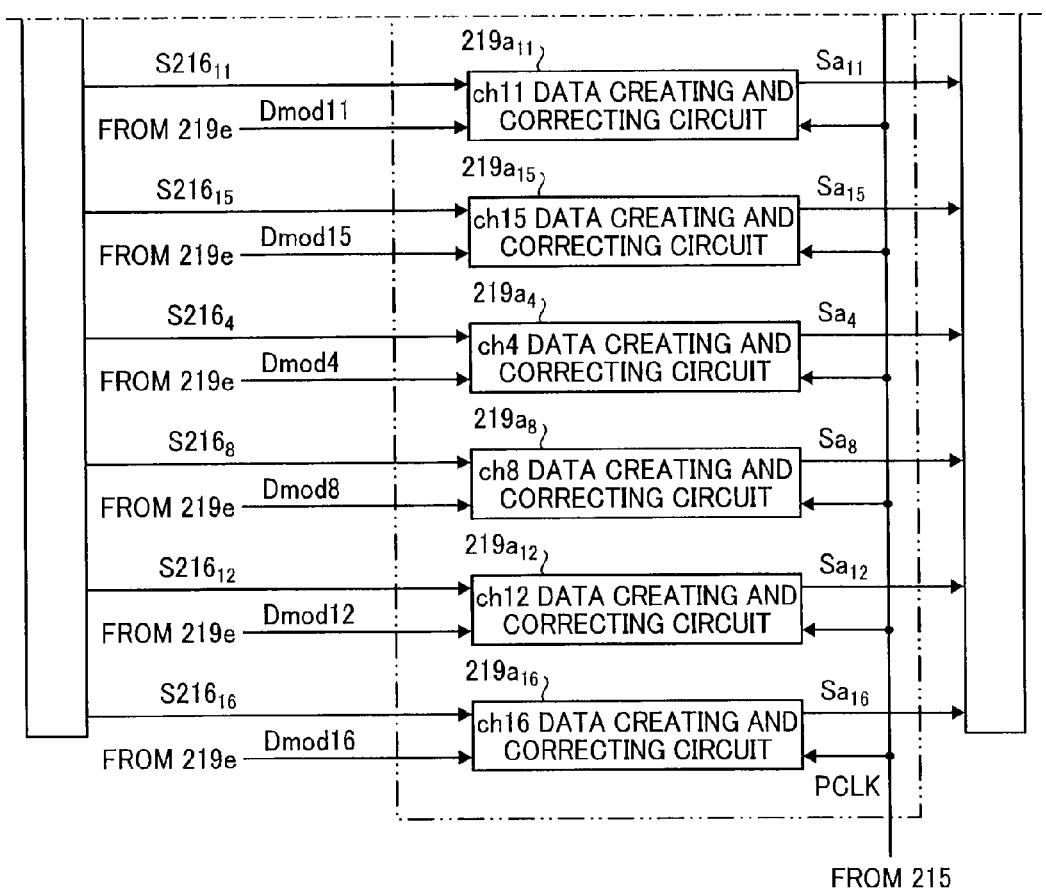

The modulation data creating circuit 219a includes, as illustrated in FIG. 17, a ch1 data creating and correcting circuit $219a_1$, a ch2 data creating and correcting circuit $219a_2$, a ch3 data creating and correcting circuit $219a_3$, . . . , and a ch16 data creating and correcting circuit $219a_{16}$.

Each of the data creating and correcting circuits has the same configuration, converts the corresponding image data into modulation data, and corrects the timing of outputting the modulation data based on the corresponding correction data.

Figure 18:
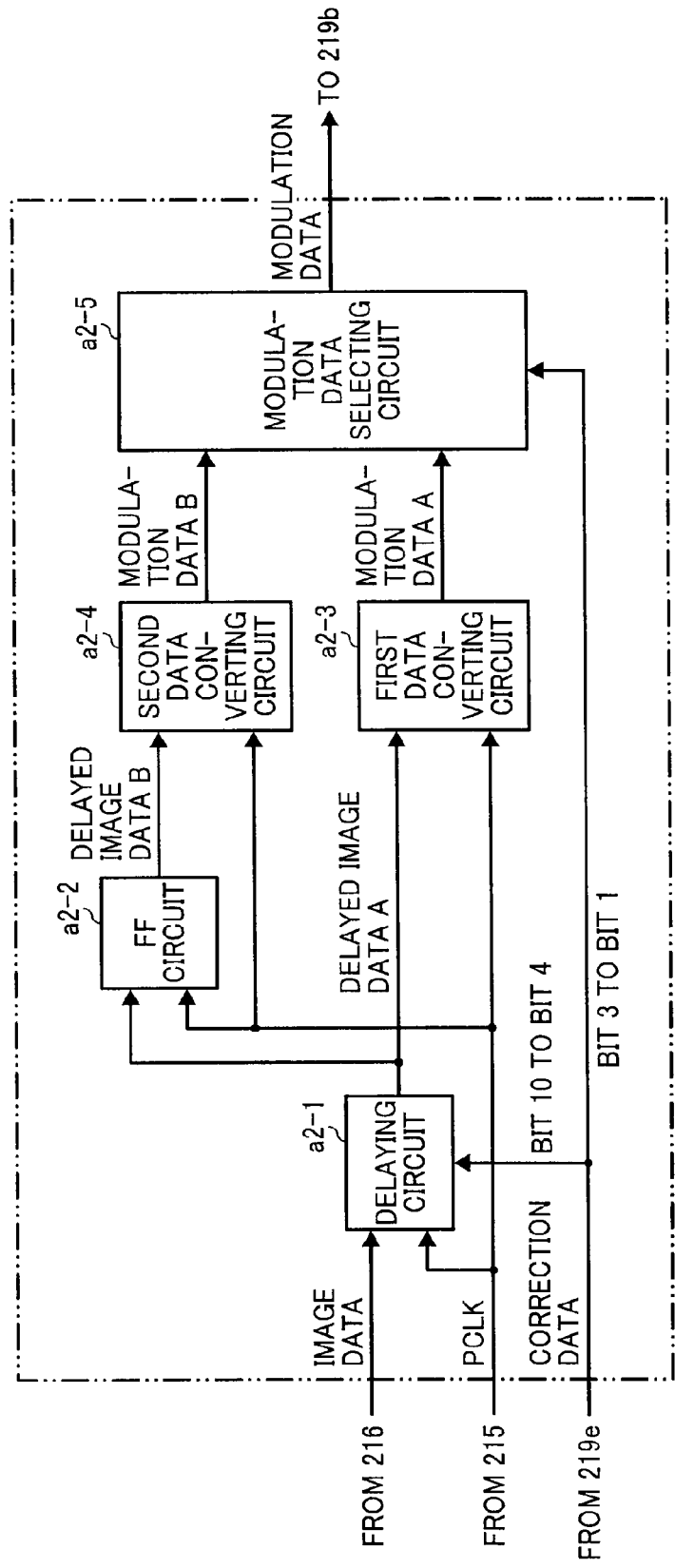
FIG. 18 is a schematic view for explaining a configuration of a data creating and correcting circuit illustrated in FIG. 17.

In this example, each of the data creating and correcting circuits includes, as illustrated in FIG. 18, a delaying circuit a2-1, a flip-flop (FF) circuit a2-2, a first data converting circuit a2-3, a second data converting circuit a2-4, and a modulation data selecting circuit a2-5.

The delaying circuit a2-1 delays the received image data by a value corresponding to the high seven bits (bit 10 to bit 4) of the received correction data, in units of one pixel clock, and outputs the delayed image data as delayed image data A.

The FF circuit a2-2 further delays the delayed image data A by one pixel clock, and outputs the delayed data as delayed image data B.

The first data converting circuit a2-3 modulates the received delayed image data A based on a conversion table illustrated in FIG. 19, and outputs the modulation data as modulation data A.

The second data converting circuit a2-4 modulates the received delayed image data B based on the conversion table illustrated in FIG. 19, and outputs the modulation data as modulation data B.

In this example, one-pixel data in each of the modulation data A and the modulation data B has 16 bits, and is output to the modulation data selecting circuit a2-5 as parallel data.

The modulation data selecting circuit a2-5 refers to a selection table illustrated in FIG. 20, and selects 16 bits from the modulation data A and the modulation data B based on values in the low four bits (bit 3 to bit 0) of the received correction data, and outputs the 16 bit-data as parallel modulation data.

For example, if the low four bits of the correction data are "0000", the bit 15 to the bit 0 of the modulation data A are selected. If the low four bits of the correction data are "0001", the bit 14 to the bit 0 of the modulation data A and the bit 15 of the modulation data B are selected. If the low four bits of the correction data are "0010", the bit 13 to the bit 0 of the modulation data A and the bit 15 and the bit 14 of the modulation data B are selected. If the low four bits of the correction data are "0011", the bit 12 to the bit 0 of the modulation data A and the bit 15 to the bit 13 of the modulation data B are selected.

An operation of each of the data creating and correcting circuits will now be explained with reference to FIG. 21. In this example, it is assumed that the correction data is "00001101100" in binary representation. In other words, the high seven bits of the correction data are "6" in decimal representation, and the low four bits are "1100" in binary representation.

When the image data is received, because the high seven bits of the correction data represents "6", the delayed image data A is the image data delayed by six pixel clocks. For example, the image data received at timing T1 (in this example, IDn) is delayed to become the data for the delayed image data A at timing T2 that is T1 plus six pixel clocks. Furthermore, because the delayed image data B is obtained by delaying the delayed image data A by one pixel clock, the image data immediately before the image data IDn (IDn−1) is the data for the delayed image data B at the timing of T2.

At the timing of T3 that is T2 plus one pixel clock, the modulation data A is data (MDn) obtained by modulating image data IDn, and the modulation data B is data (MDn−1) obtained by modulating image data IDn−1.

At this time, because the low four bits of the correction data is "1100" in binary representation, the modulation data selecting circuit a2-5 selects the bit 3 to the bit 0 of the modulation data A and the bit 15 to the bit 4 of the modulation data B. In other words, MDn[3:0] and MDn−1[15:4] are output as the modulation data.

In this embodiment, because the timing at which the light-emitting element ch1 emits light is used as the reference, the correction data Dmod1 for the light-emitting element ch1 is "00000000000".

Referring back to FIG. 9, the PWM data creating circuit 219b converts the modulation data ($Sa_1$ to $Sa_{16}$) received from the modulation data creating circuit 219a into serial PWM data ($Sb_1$ to $Sb_{16}$).

Figure 22A:
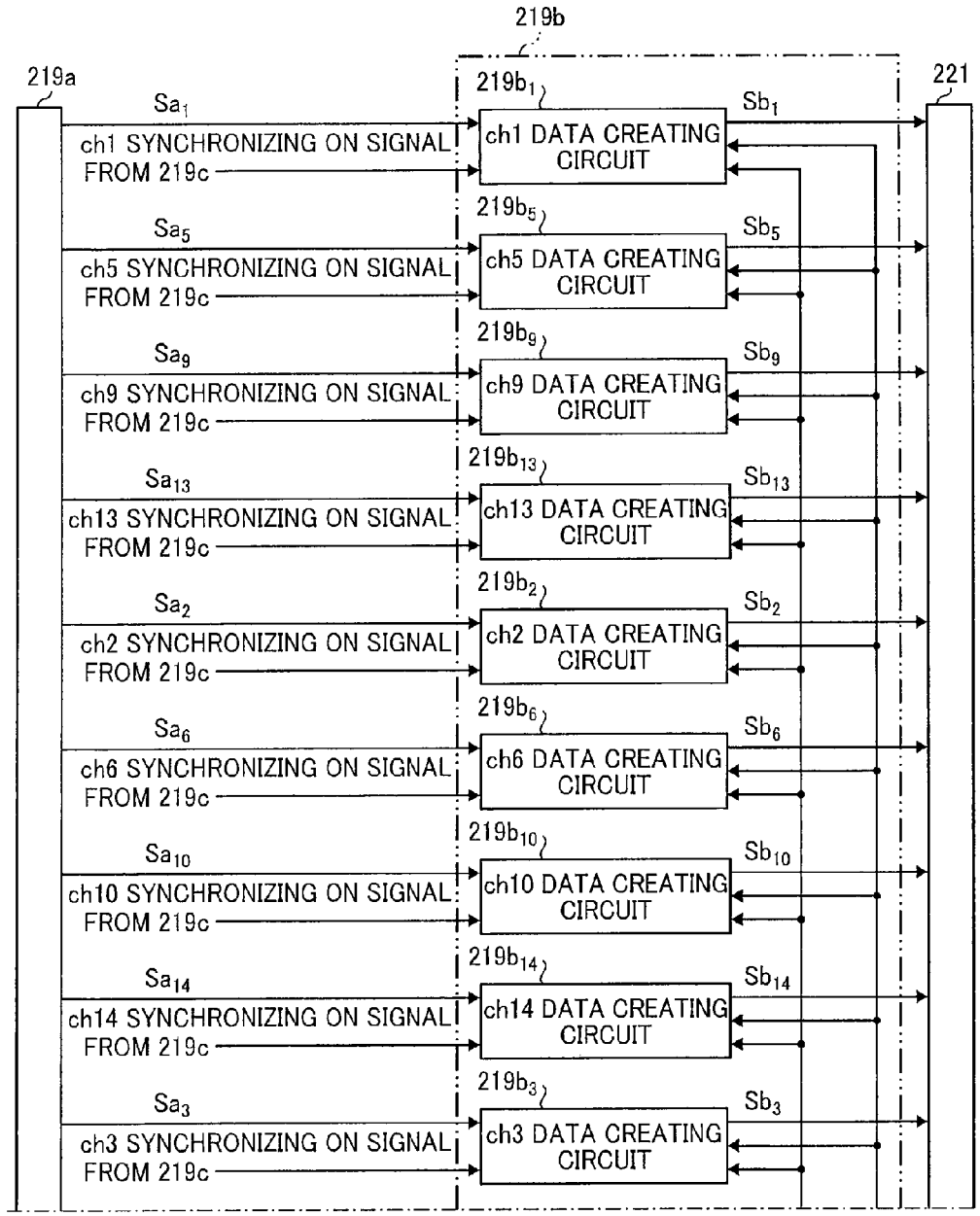
FIG. 22 is a schematic view for explaining a configuration of a PWM data creating circuit illustrated in FIG. 9.
Figure 22B:
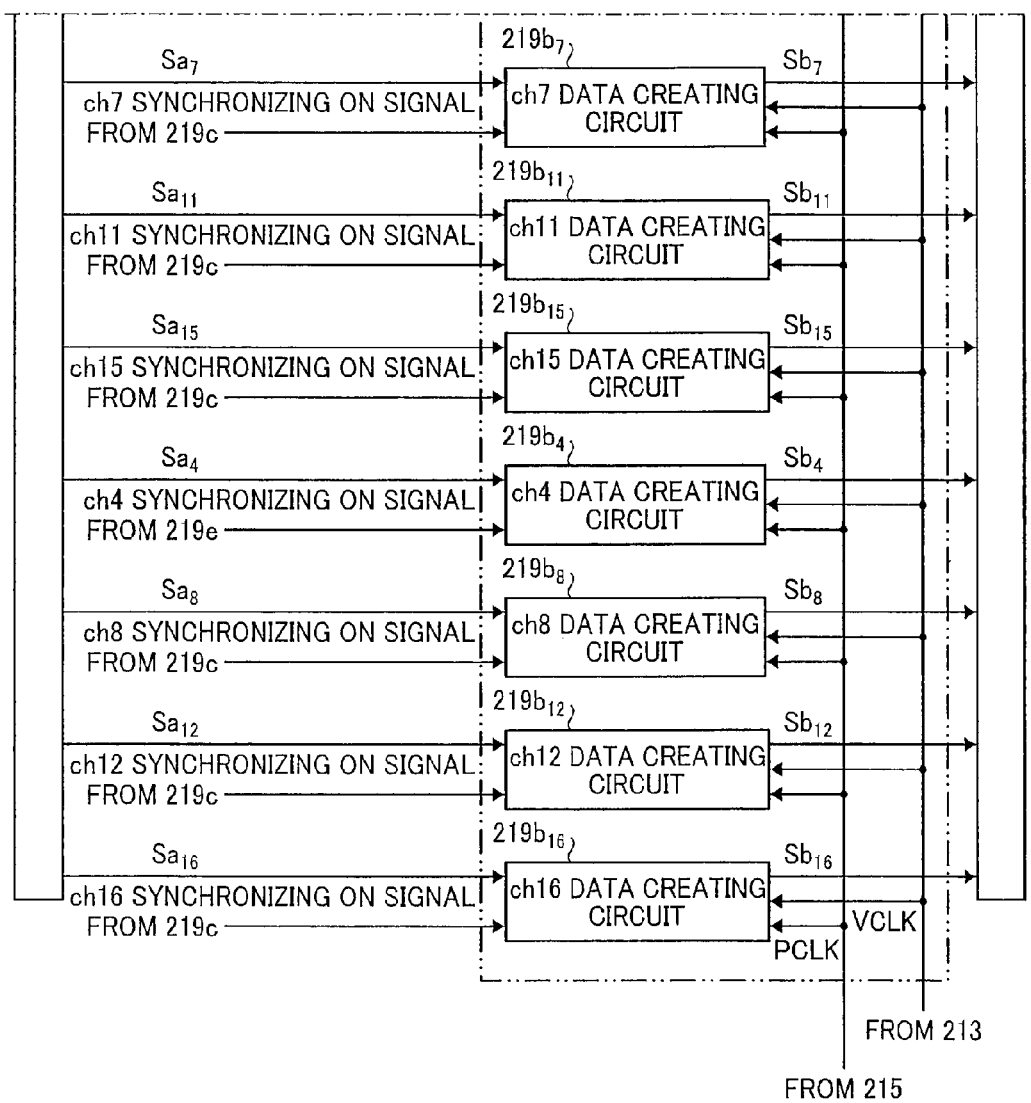

The PWM data creating circuit 219b includes, as illustrated in FIG. 22, a ch1 data creating circuit $219b_1$ that converts the modulation data $Sa_1$ into PWM data $Sb_1$, a ch2 data creating circuit $219b_2$ that converts the modulation data $Sa_2$ into PWM data $Sb_2$, a ch3 data creating circuit $219b_3$ that converts the modulation data $Sa_3$ into PWM data $Sb_3$, . . . , and a ch16 data creating circuit $219b_{16}$ that converts the modulation data $Sa_{16}$ into PWM data $Sb_{16}$.

Each of the data creating circuits has the same configuration, and converts the corresponding modulation data into serial PWM data. In this example, as illustrated in FIGS. 23 and 24 as examples, 16-bit modulation data is output at the timing of rising edges of the high frequency clock signal $VCLK_1$ and the high frequency clock signal $VCLK_2$, that is, at each ½ high frequency clock, sequentially from the lower bit, one bit at a time.

Figure 23:
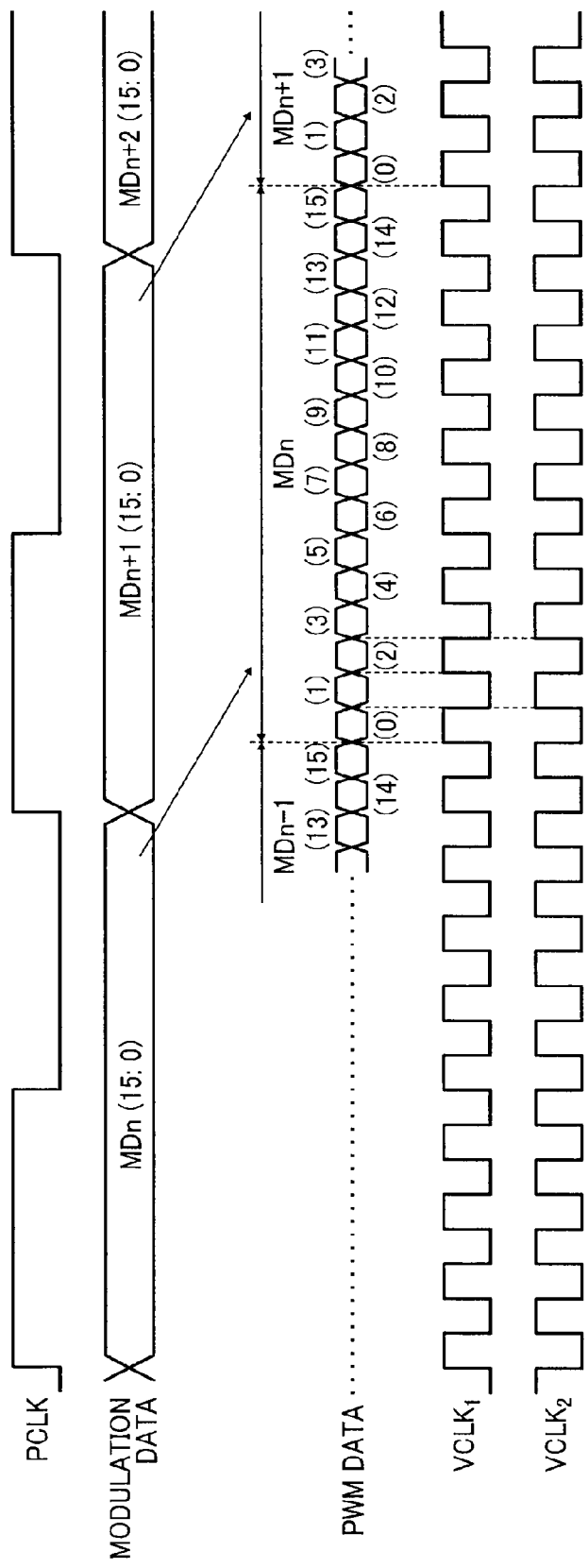
FIG. 23 is a first timing chart for explaining an operation of data creating circuits illustrated in FIG. 22.
Figure 24:
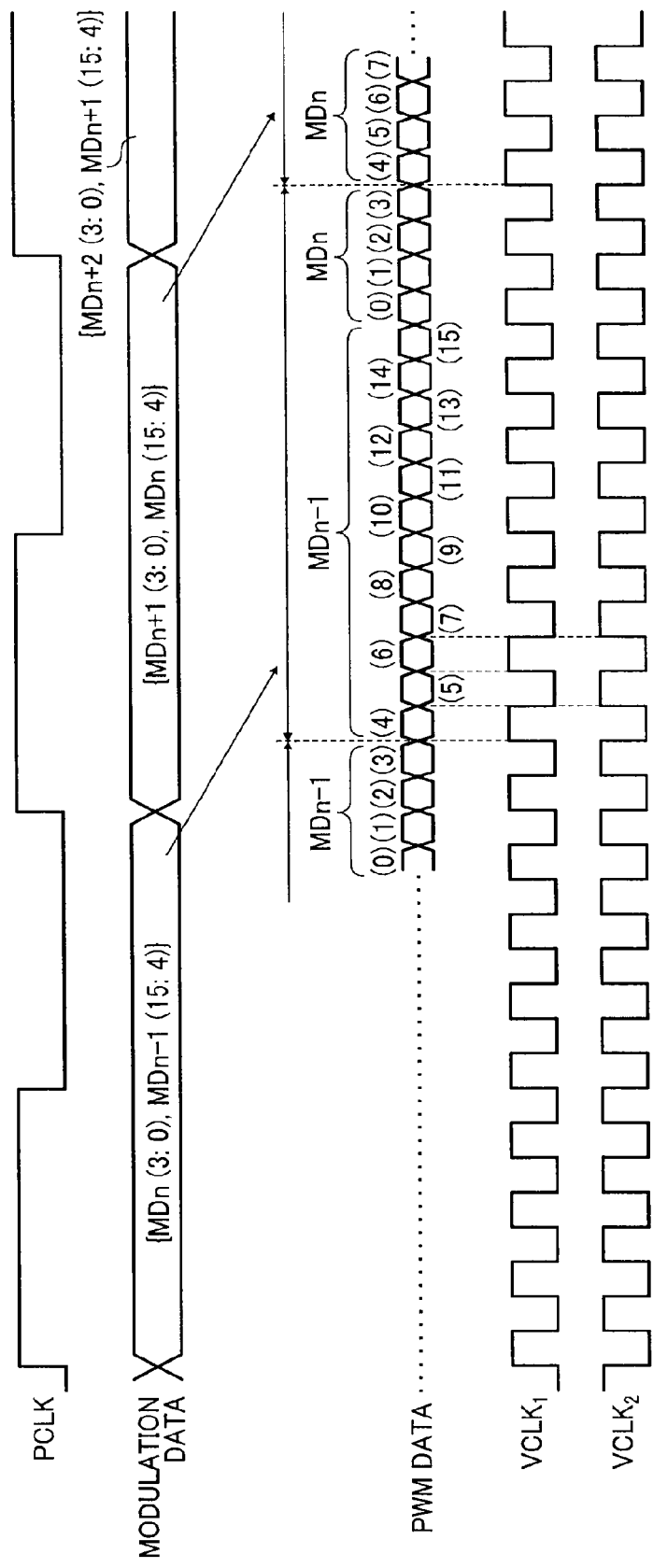
FIG. 24 is a second timing chart for explaining the operation of the data creating circuits illustrated in FIG. 22.

FIG. 23 shows an example that the modulation data is the bit 15 to the bit 0 of the modulation data A. FIG. 24 shows an example that the modulation data is the bit 3 to the bit 0 of the modulation data A and the bit 15 to the bit 4 of the modulation data B. In FIG. 24, MDn[0] is output at a timing delayed by twelve ½ high frequency clocks, compared with the timing at which MDn[0] is output in FIG. 23. In this manner, the timing for causing each of the light-emitting elements to start writing can be delayed in a precision of the ½ high frequency clocks.

Furthermore, when the received synchronizing ON signal is at "high level", each of the data creating circuits sets the PWM data forcibly "high level".

Referring back to FIG. 9, the light source driving circuit 221 includes a plurality of driving units (a ch1 driving unit to a ch16 driving unit) corresponding to the light-emitting elements (ch1 to ch16). Each of the driving units receives corresponding PWM data from the PWM data creating circuit 219b. An output signal of each of the driving units is supplied to the corresponding light-emitting element. In other words, the ch1 driving unit drives the light-emitting element ch1 based on the PWM data $Sb_1$; the ch2 driving unit drives the light-emitting element ch2 based on the PWM data $Sb_2$; . . . ; and the ch16 driving unit drives the light-emitting element ch16 based on the PWM data $Sb_{16}$.

As may be clear from the explanations above, the measuring method is implemented in the scanning control device 22 in the optical scanning device 1010 according to the embodiment.

As explained above, the scanning control device 22 according to the embodiment includes the high frequency clock generation circuit 213 that generates the two high frequency clock signals ($VCLK_1$ and $VCLK_2$) having different phases, the image data creating circuit 216 that creates a plurality of pieces of image data (data to be written) corresponding to the light-emitting elements based on image information, the writing control circuit 219 that creates a plurality of pieces of the modulation data corresponding to the light-emitting elements from the pieces of the image data, and adjusts the timing at which each piece of the modulation data is output in the units of "phase difference corresponding time", and the light source driving circuit 221 that drives the light-emitting elements based on the PWM data output from the writing control circuit 219.

The writing control circuit 219 includes the synchronizing ON control circuit 219c that generates a plurality of the synchronizing ON signals for causing the selected light-emitting element(s) to turn ON, the synchronizing time measuring circuit 219d that measures the time interval between the timing of a change in the line clear signal LCLR and the timing of the subsequent change in the leading edge synchronization detection signal, and the correction data creating circuit 219e that creates the correction data for each of the light-emitting elements based on the measurement results and the like performed by the synchronizing time measuring circuit 219d. In this manner, the deviation in timing of the start of writing in the light-emitting elements ch2 to ch16 with respect to the light-emitting element ch3 can be obtained individually in real time and more precisely than conventional techniques as the correction data in the units of the "phase difference corresponding time". Therefore, the timing at which the light-emitting elements are turned on can be controlled in real time more precisely than a conventional technology.

Furthermore, because the writing control circuit 219 includes the modulation data creating circuit 219a, timing at which each piece of the modulation data is output can be controlled in units of the "phase difference corresponding time" based on the correction data so that timing of the start of writing in the light-emitting elements can be coincident with each other.

Furthermore, the modulation data creating circuit 219a includes the delaying circuit a2-1 that delays the input signal by time corresponding to the value represented by the high seven bits of the correction data (first correction data) in units of one pixel clock, the FF circuit a2-2 that delays the signal output from the delaying circuit a2-1 by one pixel clock, and the modulation data selecting circuit a2-5 that selects a plurality of pieces of data from the parallel data obtained from the signal output from the delaying circuit a2-1 and the parallel data obtained from the signal output from the FF circuit a2-2, depending on the values in the low four bits of the correction data (second correction data). Therefore, the timing for outputting of the modulation data can be adjusted in a simple circuit structure.

Furthermore, because the optical scanning device 1010 according to the embodiment includes the scanning control device 22, high-resolution optical scanning can be performed precisely.

Furthermore, even if the optical characteristics of an optical component or the positional relationship of optical components change due to a temperature change or aging, the scanning control device 22 can obtain appropriate correction data corresponding to such a change almost in real time. Therefore, the positions of start of writing in the scanning lines can be aligned in a stable manner.

Furthermore, because the laser printer 1000 according to the embodiment includes the optical scanning device 1010 capable of performing high-resolution optical scanning precisely, high-quality images can be formed at a high speed.

In the embodiment, the delaying circuit a2-1 in each of the data creating and correcting circuits of the modulation data creating circuit 219a may include a shift register and a selector circuit. In such a configuration, the number of stages in the shift register is decided depending on the distance of the other light-emitting elements from the reference light-emitting element in the M direction. In this manner, the circuit can be configured more efficiently, and the size of the circuit can be reduced. As an example, FIG. 25 describes the position of the second-column spots, the position of the third-column spots, and the position of the fourth-column spots on the photosensitive drum (the surface to be scanned) with respect to the first-column spots in the units of pixels when all of the light-emitting elements are turned on simultaneously under the assumptions that the resolution is 1200 dpi (21 micrometers/dot) and the magnification ratio of the optical system is expected to change between four and six times due to a temperature change or aging.

Figures 26, 27:
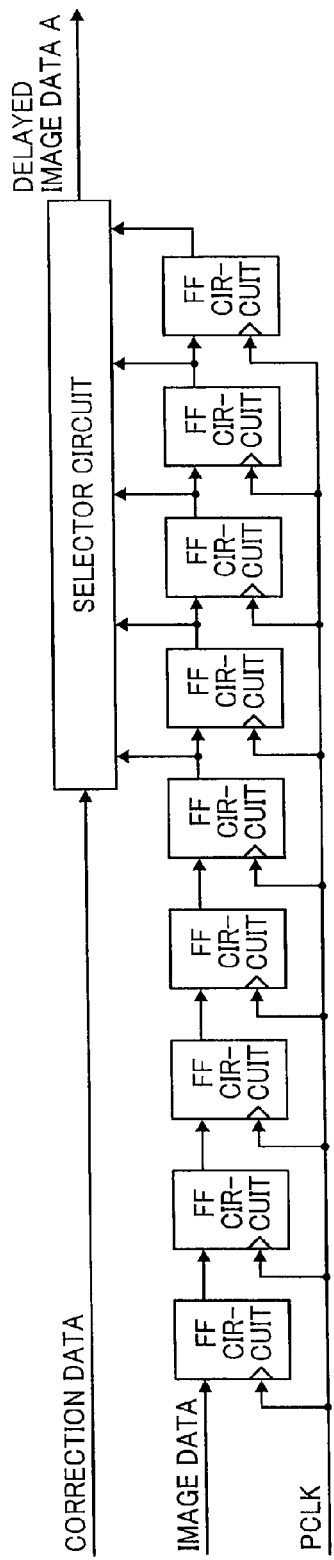
FIG. 26 is a second schematic view for explaining the variation of the delaying circuit.
FIG. 27 is a third schematic view for explaining the variation of the delaying circuit.

Under these assumptions, when the first-column light-emitting elements are used as a reference, delaying circuit corresponding to the second-column light-emitting elements requires a nine-stage shift register; delaying circuit corresponding to the third-column light-emitting elements requires an eighteen-stage shift register; and delaying circuit corresponding to the fourth-column light-emitting elements requires a twenty-six-stage shift register, as illustrated in FIG. 26.

In the delaying circuit corresponding to the second-column light-emitting elements, as illustrated in FIG. 27, signals output from the fifth to the ninth stages of the shift register are input to the selector circuit. The high seven bits of the correction data are also input to the selector circuit. The selector circuit selects one of the signals output from the fifth to the ninth stages of the shift register depending on the value represented by the high seven bits of the correction data, and outputs the selected signal as the delayed image data A. More specifically, if the high seven bits of the correction data represent the value "5", the selector circuit selects the output signal of the fifth stage of the shift register; if the high seven bits of the correction data represent the value "6", the selector circuit selects the output signal of the sixth stage of the shift register; if the high seven bits of the correction data represent the value "7", the selector circuit selects the output signal of the seventh stage of the shift register; if the high seven bits of the correction data represent the value "8", the selector circuit selects the output signal of the eighth stage of the shift register; and if the high seven bits of the correction data represent the value "9", the selector circuit selects the output signal of the ninth stage of the shift register.

In the delaying circuit corresponding to the third-column light-emitting elements, signals output from the eleventh to the eighteenth stages of the shift register are input to the selector circuit, and the selector circuit selects one of these signals depending on the value represented by the high seven bits of the correction data. Similarly, in the delaying circuit corresponding to the fourth-column light-emitting elements, signals output from the seventeenth to the twenty-sixth stages of the shift register are input to the selector circuit, and the selector circuit selects one of these signals depending on the value represented by the high seven bits of the correction data.

Furthermore, in the embodiment explained above, two high frequency clock signals whose phase difference is 180 degrees are used as the high frequency clock signals. However, the present invention is not limited thereto. For example, by using a plurality of high frequency clock signals with smaller phase differences, the positions of start of writing in the scanning lines can be aligned in a smaller time resolution.

Figure 28:
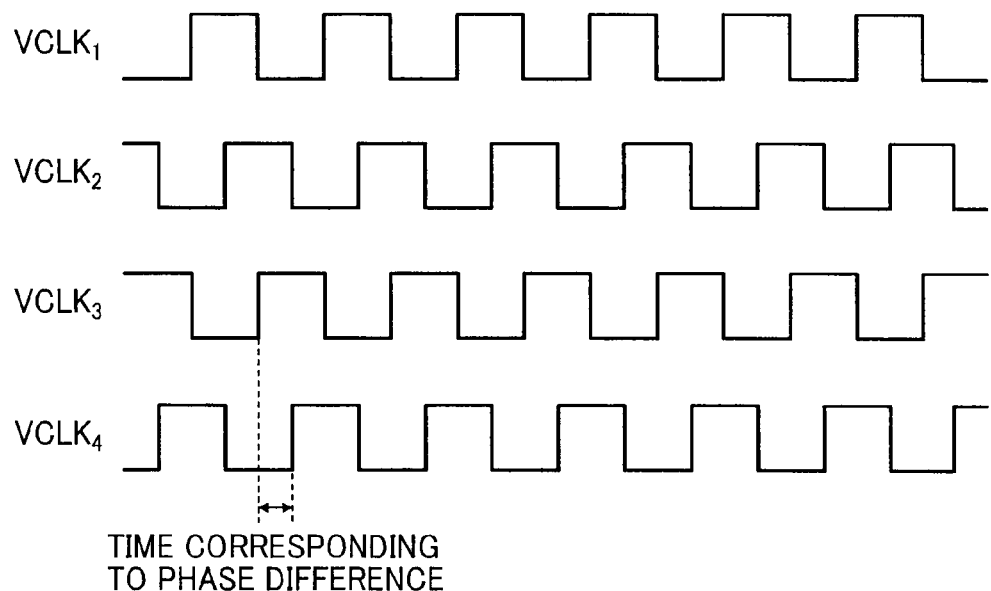
FIG. 28 is a schematic view for explaining four high frequency clock signals having different phases.
Figure 29:
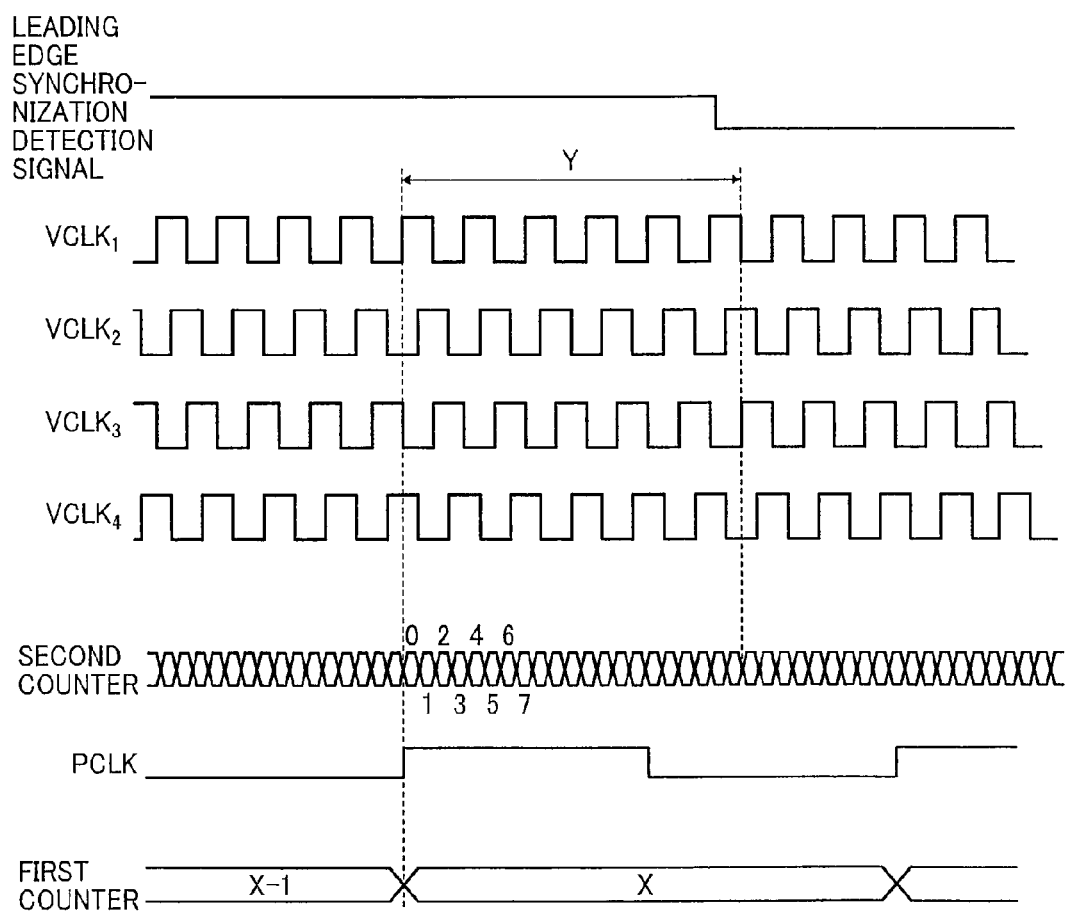
FIG. 29 is a timing chart for explaining an operation of the synchronizing time measuring circuit corresponding to FIG. 28.

FIG. 28 indicates an example in which the high frequency clock generation circuit 213 generates four high frequency clock signals ($VCLK_1$, $VCLK_2$, $VCLK_3$, and $VCLK_4$) having different phases. In this example, the time corresponding to the phase difference between the high frequency clock signals is ¼ cycle of the high frequency clock signal. The second counter in the synchronizing time measuring circuit 219d is incremented at every ¼ cycle of the high frequency clock signal as illustrated in FIG. 29. Therefore, the correction data Dmod can be obtained from Equation (2):

$$D\bmod = (X1 \times 32 + Y1) - (X2 \times 32 + Y2) \qquad (2)$$

When the correction data Dmod calculated by Equation (2) is expressed in a 12-bit binary number (bit 11 to bit 0), the low five bits (bit 4 to bit 0) of the correction data Dmod will represent a value in units of the ¼ high frequency clock, and the high seven bits (bit 11 to bit 5) will represent a value in units of one pixel clock.

In this example, the high seven bits of the correction data Dmod are input to the delaying circuit a2-1. The first data converting circuit a2-3 and the second data converting circuit a2-4 then convert the one-pixel data into 32-bit data (see FIG. 30). The modulation data selecting circuit a2-5 then selects 32 bits from the modulation data A and the modulation data B depending on the value in the low five bits of the received correction data, and outputs the 32 bits as the parallel modulation data (see FIG. 31).

Furthermore, in the embodiment explained above, the position at which the light-emitting element ch1 starts writing is used as the reference. However, the present invention is not limited thereto.

Furthermore, if the light-emitting elements in the same column (for example, the light-emitting elements ch1, ch5, ch9, and ch13) start writing at almost the same position in the embodiment above, synchronized column information for allowing a column to be identified can be used instead of the synchronizing ch information Dfch. In such an example, the correction data is created for each of the columns.

Furthermore, in the embodiment explained above, the first-column light-emitting elements, the second-column light-emitting elements, the third-column light-emitting elements, and the fourth-column light-emitting elements are arranged equally spaced in the M direction. However, the present invention is not limited thereto.

Furthermore, in the embodiment explained above, the two-dimensional light-emitting element array 100 includes sixteen light-emitting elements. However, the present invention is not limited thereto.

Furthermore, in the embodiment explained above, the image forming apparatus is explained to be the laser printer 1000. However, the present invention is not limited thereto. Any image forming apparatus including the optical scanning device 1010 can form high-quality images at a high speed.

For example, the image forming apparatus may be an image forming apparatus directly radiating laser light onto a medium (such as paper) coloring by the laser light.

The image forming apparatus may be an image forming apparatus in which a silver-salt film is used as an image carrier. In this case, a latent image is formed on the silver-salt film by optical scanning, and the latent image can be visualized by a process same as a development process in a common silver halide photography process. The image can be transferred onto photographic paper by a process same as a printing process in a common silver halide photography process. Such image forming apparatuses can serve as an optical plate-making device or an optical drawing device for drawing CT scan images or the like.

Figure 32:
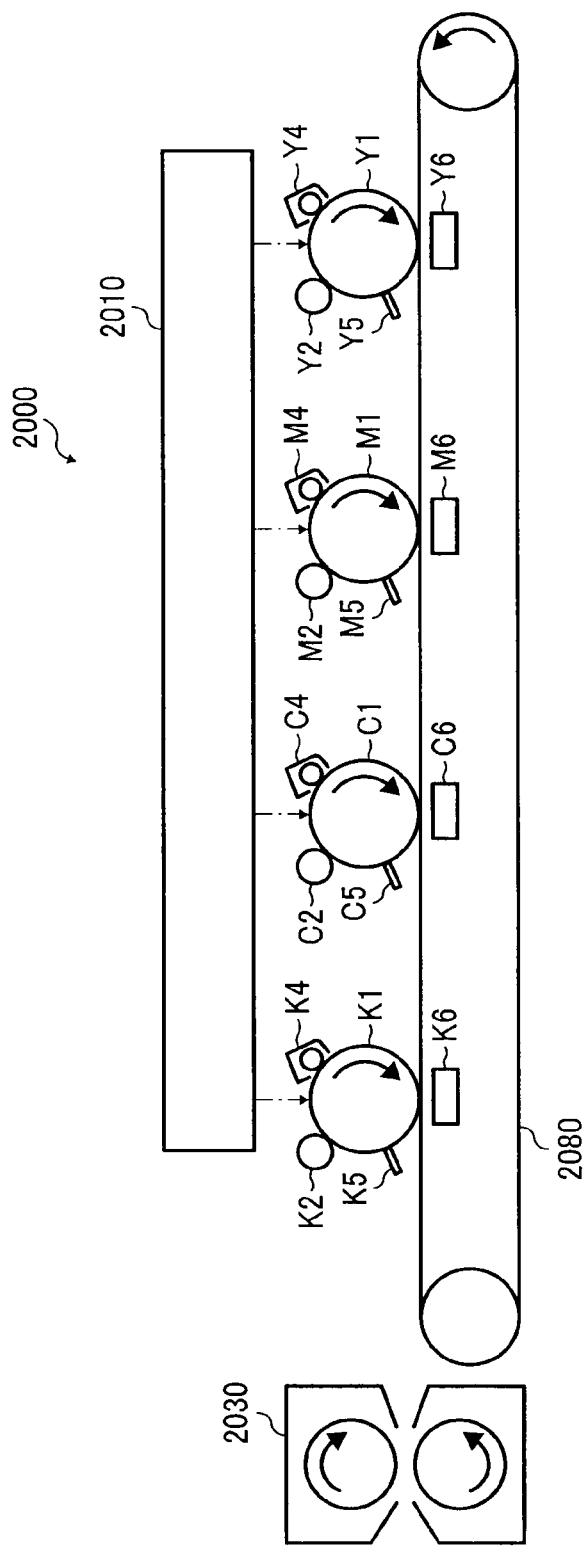
FIG. 32 is a schematic view of a structure of a color printer.

Furthermore, as illustrated in FIG. 32 as an example, the image forming apparatus may be a color printer 2000 having a plurality of photosensitive drums.

The color printer 2000 is a tandem multiple color printer that forms images in full color by superimposing four colors (black, cyan, magenta, and yellow). The color printer 2000 includes: for example, "a photosensitive drum K1, a charging unit K2, a developing unit K4, a cleaning unit K5, and a transfer unit K6" for black; "a photosensitive drum C1, a charging unit C2, a developing unit C4, a cleaning unit C5, and a transfer unit C6" for cyan; "a photosensitive drum M1, a charging unit M2, a developing unit M4, a cleaning unit M5, and a transfer unit M6" for magenta; "a photosensitive drum Y1, a charging unit Y2, a developing unit Y4, a cleaning unit Y5, and a transfer unit Y6" for yellow; an optical scanning device 2010, a transfer belt 2080, and a fixing unit 2030.

Each of the photosensitive drums is rotated in the direction indicated by the arrow in FIG. 32, and each of the charging units, the developing units, the transfer units, and the cleaning units are arranged around each of the photosensitive drums sequentially in the direction of rotation of the photosensitive drums. Each of the charging units uniformly charges the surface of the corresponding photosensitive drum. The surface of each of the photosensitive drums charged by the charging unit is irradiated with the light beams output from the optical scanning device 2010, and a latent image is formed on each of the photosensitive drums. The corresponding developing unit then forms a toner image on the surface of each of the photosensitive drums. The corresponding transfer unit sequentially transfers the toner image of each color onto a recording sheet, and the fixing unit 2030 finally fixes the image onto the recording sheet.

The optical scanning device 2010 includes a light source that is the same as the light source 14 and a scanning control device that is the same as the scanning control device 22 in a manner corresponding to each of the colors. Therefore, the optical scanning device 2010 can achieve the same advantages as those of the optical scanning device 1010. Furthermore, the color printer 2000 can achieve the same advantages as those of the laser printer 1000.

The color printer 2000 may use an optical scanning device that is the same as the optical scanning device 1010 correspondingly to each of the colors instead of the optical scanning device 2010.

According to one aspect of the present invention, the deviation in timing of the start of writing in a plurality of scanning lines can be measured in real time and precisely.

According to another aspect of the present invention, high-resolution optical scanning can be performed precisely.

According to still another aspect of the present invention, because the optical scanning device according to the present invention is provided, high-quality images can be formed at a high speed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A measuring method for measuring a deviation in timing of start of writing in a plurality of scanning lines using an optical scanning device that writes image information on a surface to be scanned by scanning the surface with a plurality of light beams along a plurality of scanning lines, the light beams being output from a plurality of light-emitting elements including a first light-emitting element and a second light-emitting element which are arranged so as to be displaced from each other in a direction corresponding to a direction of the scanning lines, the measuring method comprising:

detecting timing at which light from the first light-emitting element is received by a light receiving element, as a first time, the light receiving element outputting a synchronization detecting signal before start of writing;

detecting timing at which light from the second light-emitting element is received by the light receiving element, as a second time; and obtaining a deviation in timing of start of writing for the second light-emitting element with respect to the first light-emitting element based on a difference between the second time and the first time.

2. An optical scanning device that scans a surface to be scanned with a plurality of light beams along a plurality of scanning lines in a main-scanning direction, the optical scanning device comprising:

a light source including a plurality of light-emitting elements that include a first light-emitting element and a second light-emitting element which are arranged so as to be displaced from each other in a direction corresponding to a direction of the scanning lines;

an optical system that focuses a plurality of light beams from the light source onto the surface to be scanned, and moves a plurality of light spots on the surface to be scanned along the scanning lines in the main-scanning direction;

a light receiving element on which light is incident before start of writing; and a control device that obtains a deviation in timing of start of writing in the scanning lines for the second light-emitting element with respect to the first light-emitting element, based on a difference between time at which light from the first light-emitting element is received by the light receiving element and time at which light from the second light-emitting element is received by the light receiving element.

3. The optical scanning device according to claim 2, wherein the control device includes a high frequency clock generation circuit that generates a plurality of high frequency clock signals having different phases, and the control device obtains the deviation in timing in units of time corresponding to a phase difference between the high frequency clock signals.

4. The optical scanning device according to claim 2, wherein the control device includes a high frequency clock generation circuit that generates a plurality of high frequency clock signals having different phases, and a pixel clock generation circuit that generates a pixel clock signal from one of the high frequency clock signals generated by the high frequency clock generation circuit, and the control device divides the deviation in timing into a first deviation represented by an integral multiple of one cycle of the pixel clock signal and a second deviation that is less than one cycle of the pixel clock signal, and obtains the first deviation in units of the cycle of the pixel clock signal and the second deviation in units of time corresponding to a phase difference between the high frequency clock signals.

5. The optical scanning device according to claim 2, wherein the control device obtains the deviation in timing of start of writing in the scanning lines for one of the light-emitting elements, in a single scan.

6. The optical scanning device according to claim 2, wherein the control device obtains deviations in timing of start of writing in the scanning lines for the light-emitting elements individually, in a single scan.

7. The optical scanning device according to claim 2, wherein the light source includes a vertical cavity surface emitting laser array.

8. An image forming apparatus comprising:
   at least one image carrier; and
   at least one optical scanning device according to claim 2 that scans the at least one image carrier with light beams modulated based on image information.

9. The image forming apparatus according to claim 8, wherein the image information is multi-colored image information.

10. An optical scanning device that scans a surface to be scanned with a plurality of light beams modulated based on image information along a plurality of scanning lines in a main-scanning direction, the optical scanning device comprising:
   a light source including a plurality of light-emitting elements being arranged so as to be displaced from each other in a direction corresponding to a direction of the scanning lines;
   an optical system that focuses a plurality of light beams from the light source onto the surface to be scanned, and moves a plurality of light spots on the surface to be scanned along the scanning lines in the main-scanning direction;
   a light-receiving element on which light is incident before start of writing;
   a pixel-clock generation circuit that generates pixel clock signals to be used as a reference in outputting pixel data;
   a writing-data creating circuit that creates a plurality of writing data corresponding to the plurality of light-emitting elements in accordance with the image information; and
   a modulation-data creating circuit that
      obtains, based on a difference between time at which light from one light-emitting element of the plurality of light-emitting elements is received by the light receiving element and time at which light from another light-emitting element of the plurality of light-emitting elements is received by the light receiving element, a deviation in timing of start of writing in the scanning lines for the another light-emitting element with respect to the one light-emitting element,
      creates a plurality of modulation data corresponding to the plurality of light-emitting elements from the plurality of writing data, and
      corrects timing to output the plurality of modulation data based on the deviation,
   wherein the modulation-data creating circuit outputs a part of a certain modulation datum of the plurality of modulation data corresponding to one pixel clock signal at timing to output a subsequent pixel clock signal.

11. The optical scanning device according to claim 10, further comprising:
   a high-frequency clock generation circuit that generates a plurality of high frequency clock signals having different phases, wherein
   the modulation-data creating circuit obtains the deviation in timing in units of time corresponding to a phase difference between the high frequency clock signals.

12. The optical scanning device according to claim 10, wherein the modulation-data creating circuit obtains the deviation in timing of start of writing in the scanning lines for one of the light-emitting elements, in a single scan.

13. The optical scanning device according to claim 10, wherein the modulation-data creating circuit obtains deviations in timing of start of writing in the scanning lines for the light-emitting elements individually, in a single scan.

14. The optical scanning device according to claim 10, wherein the light source includes a vertical cavity surface emitting laser array.

15. An image forming apparatus, comprising:
   at least one image carrier; and
   at least one optical scanning device according to claim 10 that scans the at least one image carrier with light beams modulated based on image information.

16. The image forming apparatus according to claim 15, wherein the image information is multi-colored image information.

* * * * *